United States Patent [19]
Azuma et al.

[11] Patent Number: 6,163,337
[45] Date of Patent: Dec. 19, 2000

[54] MULTI-VIEW POINT IMAGE TRANSMISSION METHOD AND MULTI-VIEW POINT IMAGE DISPLAY METHOD

[75] Inventors: Takeo Azuma, Nara; Kenya Uomori, Hirakata; Atsushi Morimura, Nara, all of Japan

[73] Assignee: Matsushita Electric Industrial Co., Ltd., Osaka, Japan

[21] Appl. No.: 08/825,723

[22] Filed: Apr. 2, 1997

[30] Foreign Application Priority Data

| Apr. 5, 1996 | [JP] | Japan | ................................... 8-083688 |
| May 14, 1996 | [JP] | Japan | ................................... 8-118711 |
| Dec. 26, 1996 | [JP] | Japan | ................................... 8-346972 |

[51] Int. Cl.$^7$ ................................................ H04N 13/00
[52] U.S. Cl. ............................. 348/43; 348/59; 382/154
[58] Field of Search ................................ 348/42–51, 59; 382/154; 358/88, 487; H04N 13/00

[56] References Cited

U.S. PATENT DOCUMENTS

| 5,175,616 | 12/1992 | Milgram et al. ........................... 358/88 |
| 5,220,441 | 6/1993 | Gerstenberger ........................... 358/487 |
| 5,416,510 | 5/1995 | Lipton et al. .............................. 348/43 |
| 5,530,774 | 6/1996 | Fogel ....................................... 382/154 |
| 5,619,256 | 4/1997 | Haskell et al. ............................. 348/43 |
| 5,625,408 | 4/1997 | Matsugu et al. ........................... 348/42 |
| 5,668,595 | 9/1997 | Katayyama et al. ...................... 348/218 |
| 5,726,704 | 3/1998 | Uomori ..................................... 348/47 |
| 5,786,848 | 7/1998 | Isobe et al. ............................... 348/51 |
| 5,801,760 | 9/1998 | Uomori ..................................... 348/47 |
| 5,825,915 | 10/1998 | Michimoto et al. .................... 382/154 |

FOREIGN PATENT DOCUMENTS

| 3-50684 | 3/1991 | Japan | .............................. G06F 15/62 |
| 3-236698 | 10/1991 | Japan | .............................. H04N 13/02 |
| 6-153239 | 5/1994 | Japan | .............................. H04N 13/00 |
| 7-220113 | 8/1995 | Japan | .............................. H04N 13/00 |

OTHER PUBLICATIONS

ISO/IEC JTC1/SC29/WG11, "Coding of Moving Pictures and Associated Audio Information", MPEG 95/Nov. 1995.
OpenGL Programming Guide (cited on p. 2 of the specification), Jun. 1993.

*Primary Examiner*—Chris S. Kelley
*Assistant Examiner*—Tung Vo
*Attorney, Agent, or Firm*—Ratner & Prestia

[57] ABSTRACT

A multi-viewpoint image transmission and display method is characterized by that in transmitting images with two or more viewpoints, distance or parallax limits in the images are appended for transmission so that the images can be brought within a fusing range, and the images are displayed by considering the transmitted distance or parallax limits and the fusing range.

26 Claims, 35 Drawing Sheets

Fig. 20

Fig. 29 OUTLINE OF MULTI-VIEWPOINT IMAGE PREDICTIVE CODING BY EXTENDED MPEG-2

MULTI-VIEW POINT IMAGE TRANSMISSION METHOD AND MULTI-VIEW POINT IMAGE DISPLAY METHOD

BACKGROUND OF THE INVENTION

1. Field of the Invention

The present invention relates to a multi-viewpoint image transmission method and a multi-viewpoint image display method. The invention also relates to an intermediate-viewpoint image generation method and parallax estimation method for multi-viewpoint images, and an apparatus for implementing the same.

2. Related Art of the Invention

Heretofore, a variety of stereovision systems have been proposed; among others, multi-ocular stereovision systems using multi-viewpoint images provide great potential as systems that enable stereoscopic moving images to be viewed simultaneously by a plurality of viewers without requiring special glasses. In the multi-ocular stereovision system, the more cameras and display apparatus used, the more natural becomes the motion parallax that the viewers can perceive, and the easier it becomes to view the images simultaneously by a large number of viewers. In actuality, however, because of such limiting factors as the size of the imaging system and the setting of camera optical axes, there is a limit to the number of cameras that can be used in practical situations. Furthermore, in the transmission and storage processes, it is desired to reduce the amount of information that tends to increase in proportion to the number of cameras used.

If, at the display side, multi-ocular stereoscopic images can be displayed by generating middle-viewpoint images from binocular stereoscopic images, this would alleviate the load of the imaging system and achieve a reduction in the amount of information for transmission and storage. If one is to generate from a plurality of images with different viewpoints a middle-viewpoint image that should be visible from an arbitrary viewpoint intermediate between the different viewpoints, one needs to estimate depth by obtaining corresponding relationships of pixels between the images.

MPEG-1 and MPEG-2 are proposed as image compression schemes for digital transmission of moving pictures. Work is also under way to transmit multi-viewpoint images by extending the MPEG-2 (ISO/IEC13818-2/PDAM3). FIG. 28 is a diagram showing an outline of the MPEG-2 syntax. Transmission by MPEG-2 involves encoding and decoding image data having a hierarchical structure of Sequence, Group of Picture (GOP), and Picture. According to ISO/IEC13818-2/PDAM3), it seems that the transmission of multi-viewpoint images is achieved by extending the GOP layer (though not clear as it is not specifically stated).

FIG. 29 shows the temporal and spatial relationships of multi-viewpoint images to be transmitted. It is attempted here to increase the coding efficiency by using parallax compensation in addition to the motion compensation used in the conventional MPEG-2 scheme. Information on each camera (camera parameters such as camera position, orientation of camera optical axis, etc.) must be appended to the multi-viewpoint images for transmission. ISO/IEC13818-2/PDAM3 states that camera parameters are included in Pic.Extension (extension of the Picture layer) shown in FIG. 28 for transmission, but no specific descriptions of the camera parameters are given.

As for camera parameter descriptions, the position of the camera, the orientation of the camera optical axis, and the distance between the camera position and image plane are defined as the camera parameters in the OpenGL, a CG language (OpenGL Programming Guide, The Official Guide to Learning OpenGL, Release 1, Addison-Wesley Publishing Company, 1993).

FIG. 30 is a diagram for explaining the definitions of the camera parameters according to the OpenGL. In FIG. 30, A is the lens center, B is the center of the image plane (the imaging surface), and C is the intersection of the image's upper edge and the perpendicular dropped from B to the upper edge. The coordinates of A, B, and C are defined as (optical_center_X, optical_center_Y, optical_center_Z), (image plane_center_X, image_plane_center_Y, image_plane_center_Z), and (image_plane_vertical_X, image_plane_vertical_Y, image plane_vertical_Z), respectively.

Here, one can easily think of transmitting multi-viewpoint images by appending the camera parameter information defined by the OpenGL to Pic.Extension.

However, with the above-described prior art method, since there is no information concerning the nearest point and farthest point in the image (the nearest point and farthest point of the subject), the problem has been that it is not possible to determine the range of depth within which to work when producing a display that reduces eye strain (for example, by controlling parallax).

Furthermore, when displaying multi-viewpoint images, the viewing distance must be determined appropriately on the basis of such conditions as the view angle at the time of shooting, the size of the imaging surface, and the distance between the lens center and the imaging surface (this is done to prevent the displayed image from becoming unnatural because of too large parallax, or conversely, from appearing flat because of the lack of stereoscopic effects). However, in the OpenGL, no definition is given of the size of the imaging surface (physical size of the CCD), and moreover, the distance between the lens center and the image forming surface is assumed to be equal to the focal length of the lens. This has lead to the problem that at the display side there is no knowing the value of the view angle used at the time of image capturing, making it impossible to determine the appropriate view angle, i.e. the viewing distance at the time of display, and thus giving rise to the possibility that the resulting stereoscopic display image may look unnatural.

SUMMARY OF THE INVENTION

In view of the above problems, it is an object of the present invention to provide a multi-viewpoint image transmission and display method that can easily accomplish the presentation of a stereoscopic image with enhanced naturalness at the display side by transmitting image information with information concerning the nearest point and farthest point in the image (that is, the nearest point and farthest point of the subject), and information concerning the size of the imaging surface, appended to it.

As for the fundamental problem of obtaining the correspondence between images for the generation of a middle-viewpoint image, it is inherently difficult to obtain such correspondence with good accuracy because of occlusion occurring at an object's contour line where the depth varies discontinuously. However, estimating the parallax near the contour line is crucial in synthesizing an intermediate image since its estimated value determines the position of the object's contour. More specifically, if there occur errors in the estimation of parallax near the object's contour line, a situation will result where pixels in the foreground region appear stuck on the background side, or conversely, pixels in the background region appear stuck on the foreground, or the object's contour line becomes disrupted, or a false contour line appear in the background region near the object's contour line.

In view of this problem, it is an object of the present invention to provide a parallax estimation method capable of estimating abrupt changes (discontinuities) in parallax near the contour line of an object, and an apparatus for implementing the same method.

The image transmission method of the invention involves including, in a header of a multi-viewpoint image, information concerning the nearest point and farthest point in the image (that is, the nearest point and farthest point of a subject) and information concerning the size of an imaging surface, and transmitting the multi-viewpoint image by appending to it the information concerning the nearest point and farthest point in the image (that is, the nearest point and farthest point of the subject) and the information concerning the size of an imaging surface, thereby making it possible to present a display at the display side considering image size and viewing distance.

The invention also provides a parallax estimation method, and an apparatus for implementing the same, wherein initial parallax and a reliability evaluation value for the initial parallax are computed, an object's contour line where parallax changes discontinuously is extracted by using the reliability evaluation value and results of edge detection, an region where the reliability of the initial parallax is low is extracted, and the parallax at the extracted region where the reliability of the initial parallax is low is set in such a manner as to connect smoothly with surrounding parallax and change across the object's contour line, thereby accomplishing parallax estimation that causes the parallax to change discontinuously across the object's contour line.

BRIEF DESCRIPTION OF THE DRAWINGS

[FIG. 20] a diagram showing examples of weighting coefficients of direction-selective filters according to the same embodiment;

DESCRIPTION OF THE REFERENCE NUMERALS

A. NEAREST POINT OF DISPLAYED IMAGE,

B. FARTHEST POINT,

C. POINT WHERE VIEWER EYE CONVERGENCE AND ACCOMMODATION COINCIDE,

A1, A2. CAMERA LENS CENTER,

B1, B2. CENTER OF IMAGE PLANE,

C1. CONVERGING POINT,

201. INITIAL PARALLAX ESTIMATING SECTION,

202. RELIABILITY EVALUATION SECTION FOR INITIAL PARALLAX ESTIMATION,

203. CONTOUR DETECTING SECTION,

204. PARALLAX ESTIMATING SECTION FOR THE ESTIMATION OF PARALLAX NEAR OBJECT'S CONTOUR

DESCRIPTION OF THE PREFERRED EMBODIMENTS

The preferred embodiments of the present invention will now be described below with reference to the accompanying drawings.

(Embodiment 1)

Figure 4:
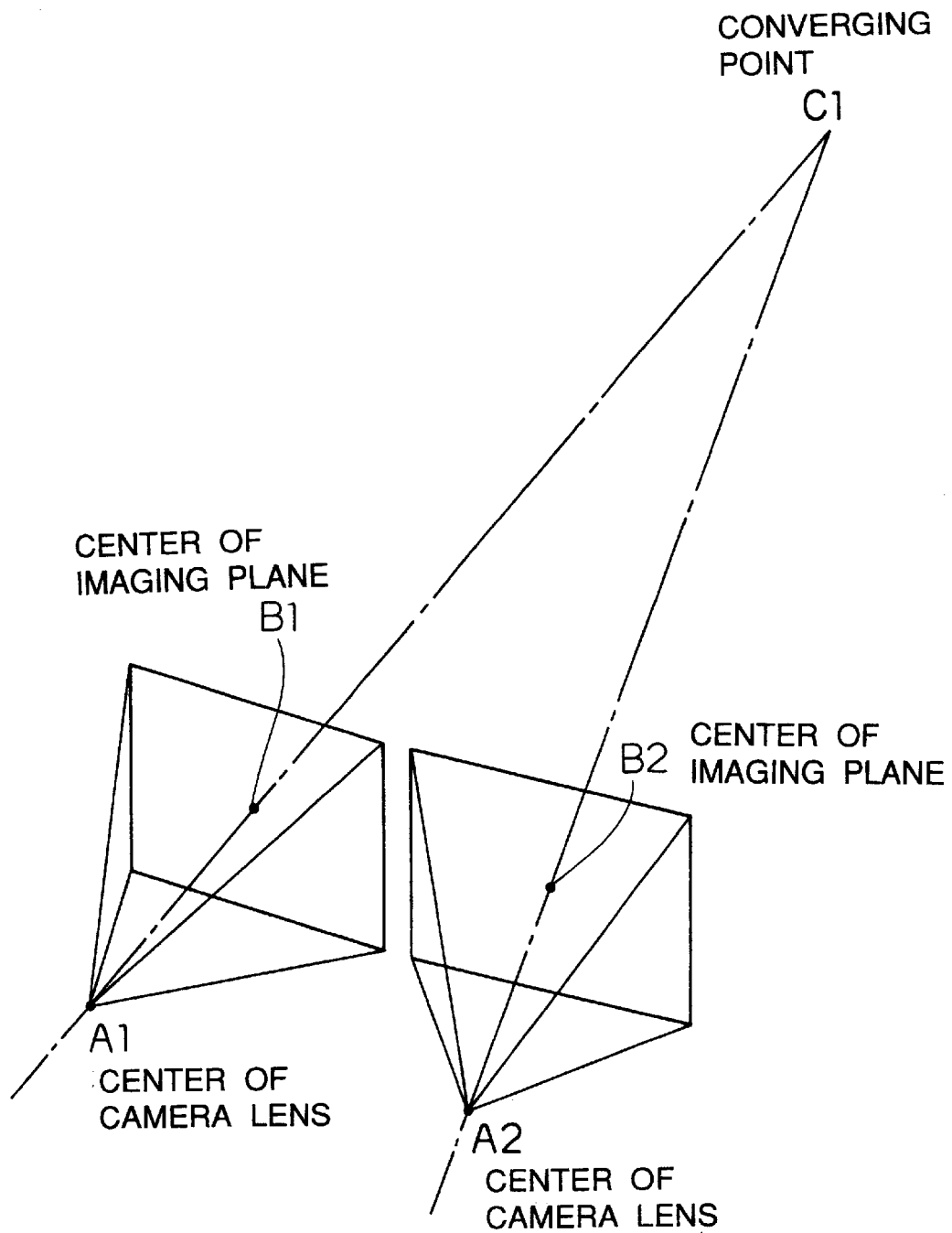
[FIG. 4] a diagram showing parameters which are defined in an image transmission method according to the first embodiment of the present invention.

FIG. 4 shows parameters which are defined in an image transmission method according to a first embodiment of the present invention. In FIG. 4, A1 and A2 are camera lens centers, and B1 and B2 are imaging plane centers (for simplicity of explanation, we consider the imaging planes and lens centers transposed with the former positioned nearer to the subject than the latter are).

In the OpenGL, the distances A1B1 and A2B2 in FIG. 4 are each defined as the focal length of the camera lens, but in the present invention, the distance between the camera lens center and the imaging plane is defined independently of the focal length of the lens. By this definition, the distance between the lens center and imaging plane when focusing is achieved can be calculated according to the distance to the subject, and thus an accurate view angle can be calculated. The view angle can be calculated from the size of the imaging surface, and the distance between the lens center and imaging plane.

Figure 2:
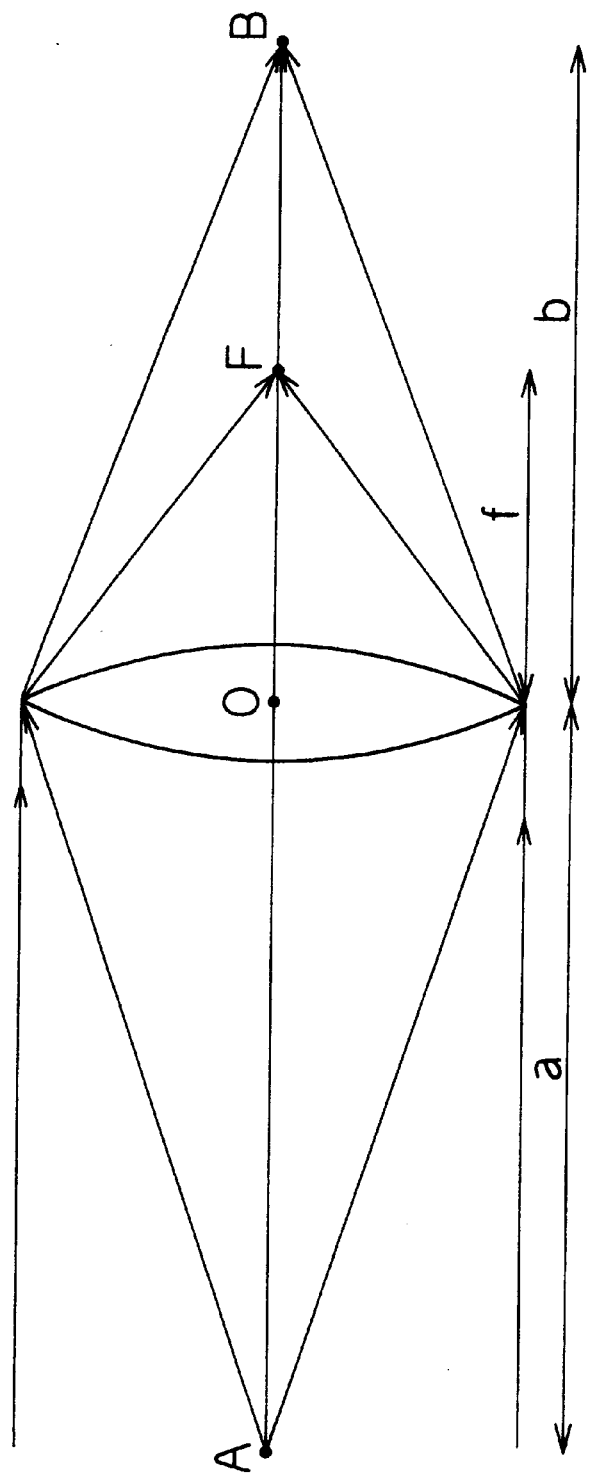
[FIG. 2] a diagram showing the relationship between the position of an subject, the position of an imaging surface when focusing achieved, and focal length, according to the same embodiment.

Referring next to FIG. 2, we will explain how the distance between the lens center and imaging plane when focusing is achieved varies according to the distance between the subject and the lens center. FIG. 2 is a diagram showing the relationship between the position of the subject,. the position of the imaging plane when focusing is achieved, and the focal length. In FIG. 2, A is the position of the subject, B is the point where light from A is focused, O is the lens center, F is the point where parallel rays are focused by the lens, a is the distance between the subject and the lens center O, b is the distance between the point B, where light from the subject is focused, and the lens center O, and f is the focal length of the lens. It is known that the relation given by Mathematical Expression 1 holds between a, b, and f.

[Mathematical Expression 1]

$$\frac{1}{a} + \frac{1}{b} = \frac{1}{f}$$

From Mathematical Expression 1, when the subject is far enough from the lens that the focal length can be ignored (a>>f), then $1/a \to 0$, so that the relation can be approximated as b=f. On the other hand, when the subject is relatively near to the lens, the term $1/a$ cannot be ignored, so that $b \neq f$. Therefore, to correctly calculate the view angle when the subject is relatively near to the lens, the distance between the lens center and the imaging plane must be defined independently of the focal length. Denoting the width of the imaging surface by win and its height by hin, the view angles at the time of image capturing are given by Mathematical Expression 2.

[Mathematical Expression 2]

$$2\mathrm{Tan}^{-1}\frac{w_{in}}{2b} \quad \text{Horizontal view angle}$$

$$2\mathrm{Tan}^{-1}\frac{h_{in}}{2b} \quad \text{Vertical view angle}$$

Hence, denoting the displayed image width by wout and its height by hout, the viewing distance that can reproduce the view angles at the time of image capturing is given by Mathematical Expression 3.

[Mathematical Expression 3]

$$\frac{w_{out}}{w_{in}}b \left( = \frac{h_{out}}{h_{in}}b \right)$$

Figure 3:
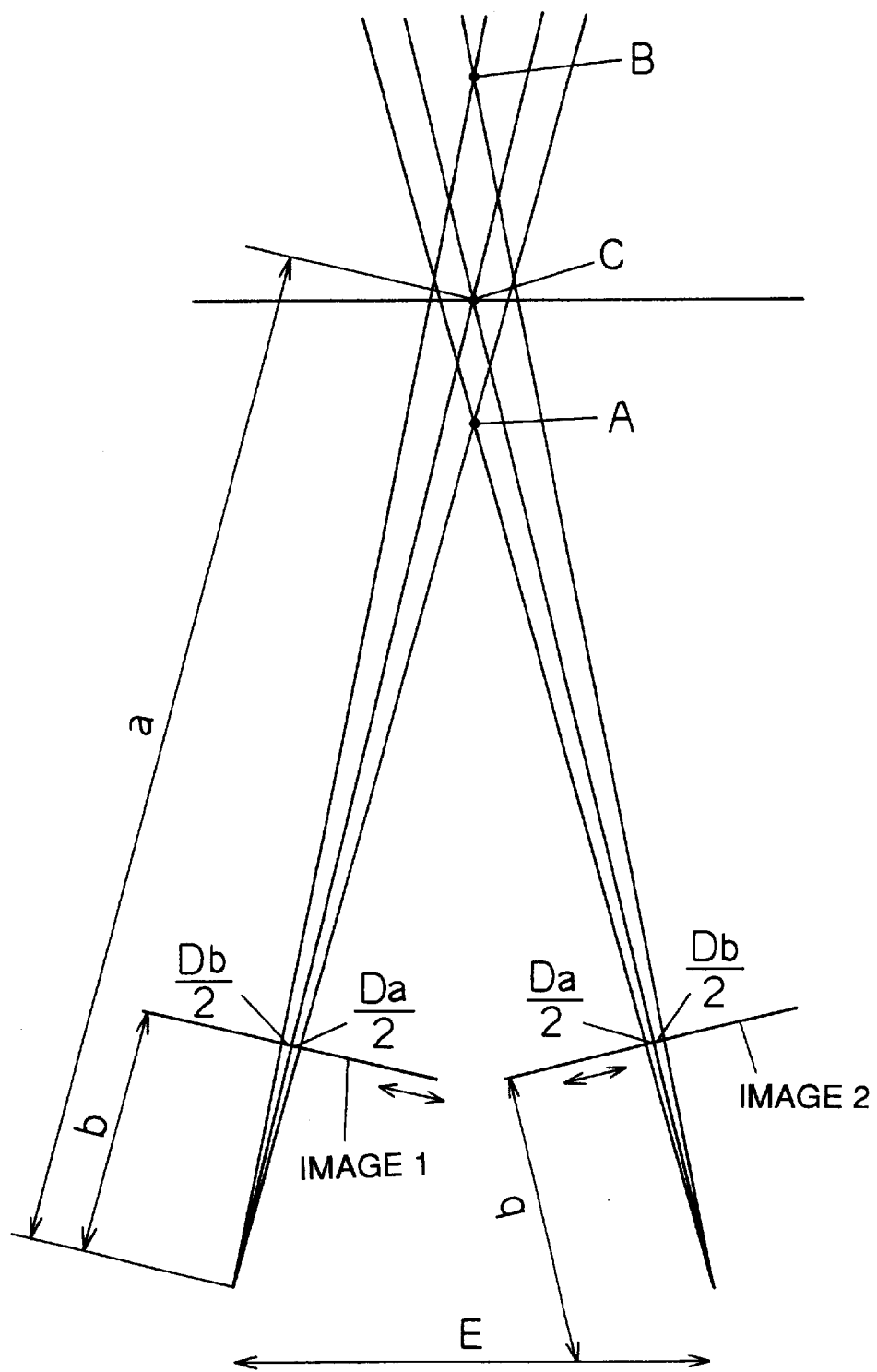
[FIG. 3] a diagram showing the positional relationship between convergence distance, nearest point, and farthest point, in a converging projection using two projectors according to the same embodiment.

Next, we will explain how viewing comfort at the display side can be improved using the nearest point and farthest point in an image. FIG. 3 is a diagram for explaining the positional relationship between the converging distance, nearest point, and farthest point in the case of a converging projection using two projectors. In FIG. 3, C is the converging point, A is the nearest point, and B is the farthest point.

In a projection with convergence, parallax becomes zero when the viewer looks at the converging point C (in FIG. 3, since both eyes see the center of the image, there is no relative positional displacement between the images seen by the left and right eyes). When the viewer looks at the nearest point A, his eyes rotate inward (the eyes are crossed), and a parallax of Da occurs between the images in the directions in which the eyes are rotated. In FIG. 3, the viewer's eyes see the point shifted inward by Da/2 from the point the eyes see when the viewer looks at the converging point C. Conversely, when the viewer looks at the farthest point B, his eyes rotate outward (the eyes are uncrossed), and a parallax of Db occurs between the images in the directions in which the eyes are rotated.

Figure 1:
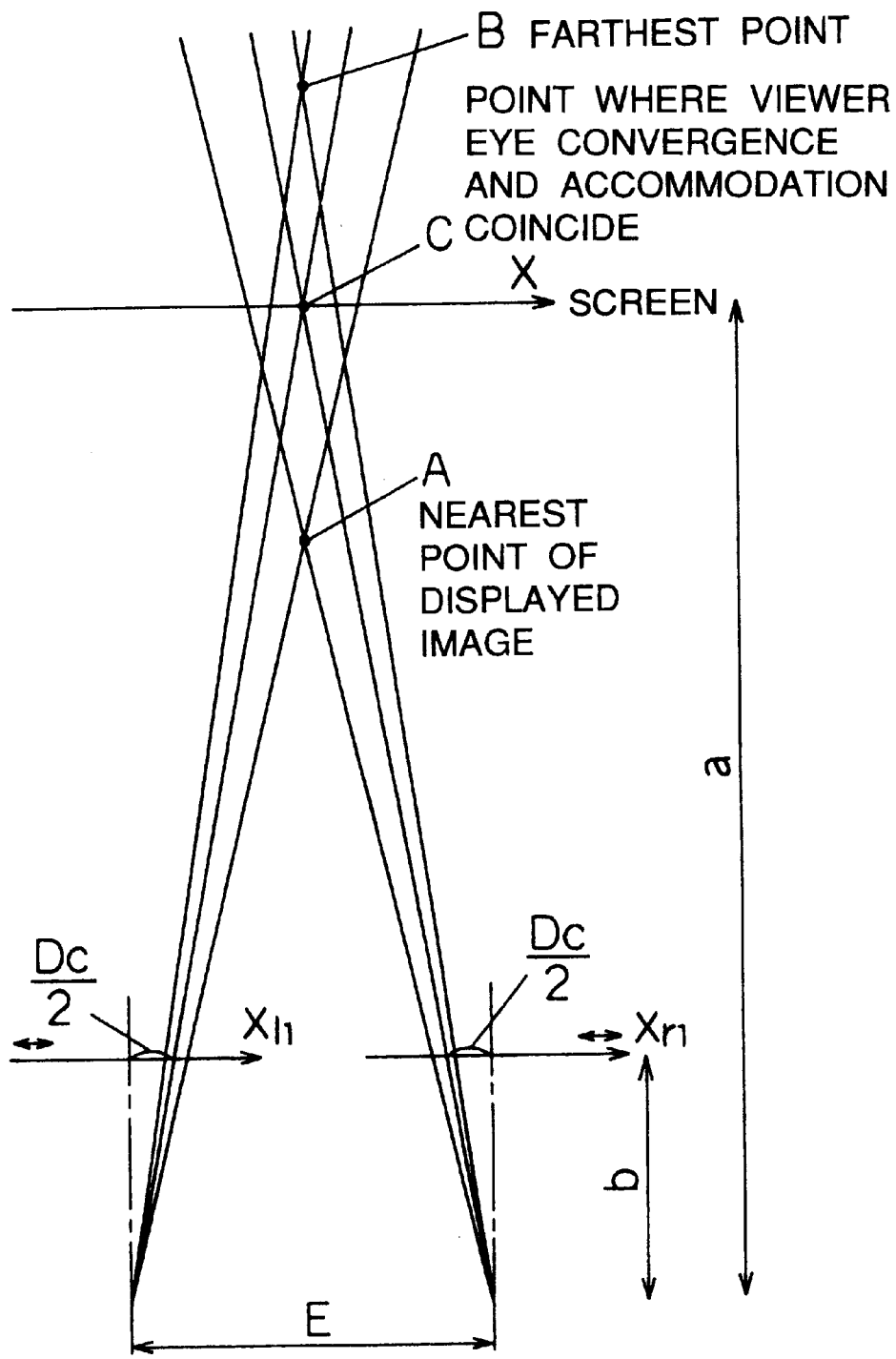
[FIG. 1] a diagram showing the positional relationship between the nearest point, farthest point, and point where viewer eye convergence and accommodation coincide, in a parallel projection according to a first embodiment of the present invention.

FIG. 1 shows the positional relationship between the nearest point, farthest point, and the point where the viewer's eye convergence and accommodation coincide, in the case of a parallel projection. In FIG. 1, A is the nearest point of the displayed image, B is the farthest point, and C is the point where the viewer's eye convergence and accommodation coincide. In the case of the parallel projection shown in FIG. 1, when images containing a parallax of Dc are displayed, the corresponding points of the images are displayed at the same points on the screen, so that the viewer's eye convergence and accommodation coincide.

The parallax within the images of FIGS. 3 and 1 gives the viewer stereoscopic perception by providing a visual cue as to whether an object in the image is located in front or behind the plane of the screen surface (the plane containing C). If the parallax becomes large, however, fusion cannot be achieved (the viewer sees a double image), giving the viewer an unnatural or unpleasant sensation.

Viewer visual comfort can be improved by shifting the images in the directions shown in FIG. 3 (shifting the images 1 and 2 in horizontal directions within respective planes vertical to the projection axes) on the basis of the nearest point, the farthest point, and the converging point achieved at the time of image capturing, and thereby varying the positional relationship the converging point with respect to the farthest distance and nearest distance. For example, by shifting the images in such a manner as to offset the average value of the parallaxes between the images, the resulting image can be made easier to view uniformly over the entire region thereof.

Figure 5:
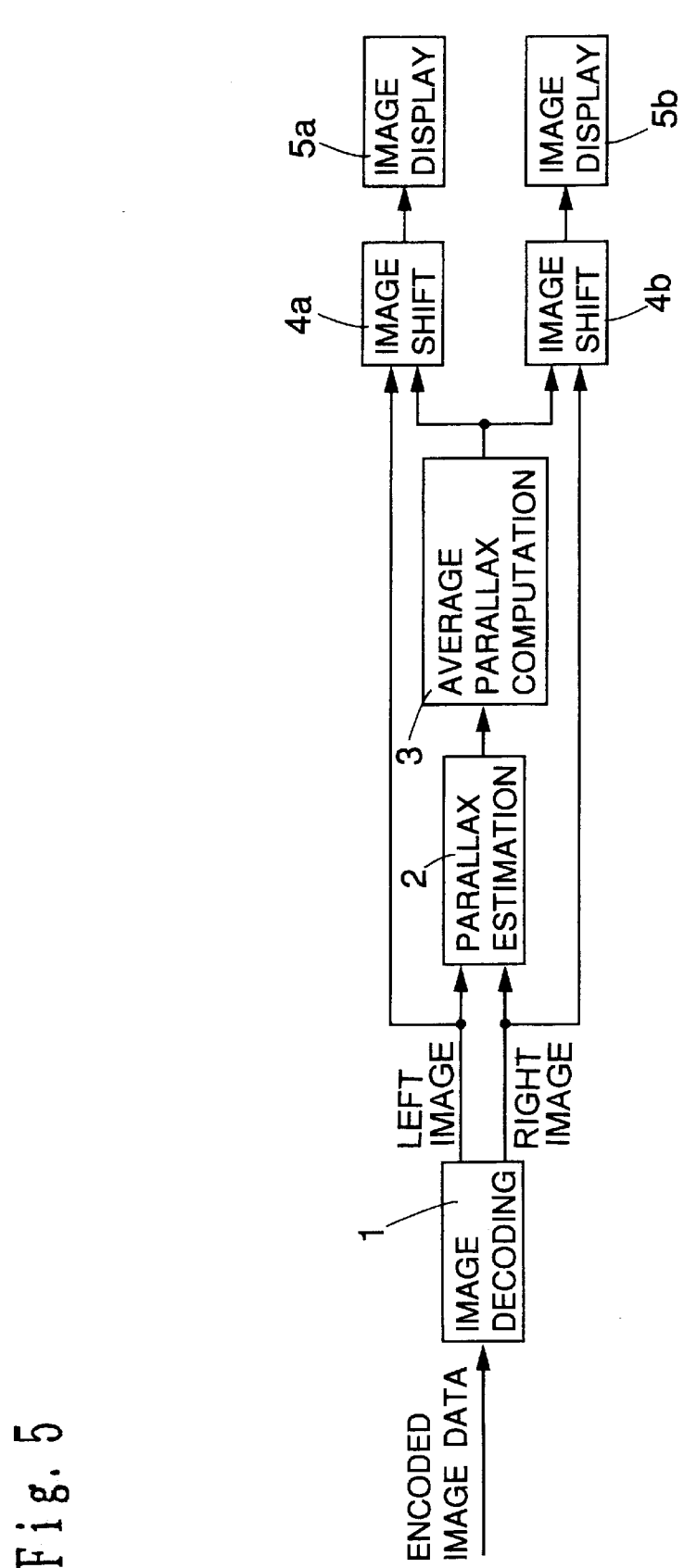
[FIG. 5] a block diagram for a process in which images are shifted in such a manner as to offset the average value of parallaxes between the images.

FIG. 5 is a block diagram of a configuration implementing such processing. For simplicity, FIG. 5 shows the case of binocular (two-viewpoint) data as an example. In FIG. 5, reference numeral 1 is an image decoding means, 2 is a parallax estimating means, 3 is an average parallax computing means, 4a and 4b are image shifting means, and 5a and 5b are image display means. The operation of each means will be described below.

Figure 6:
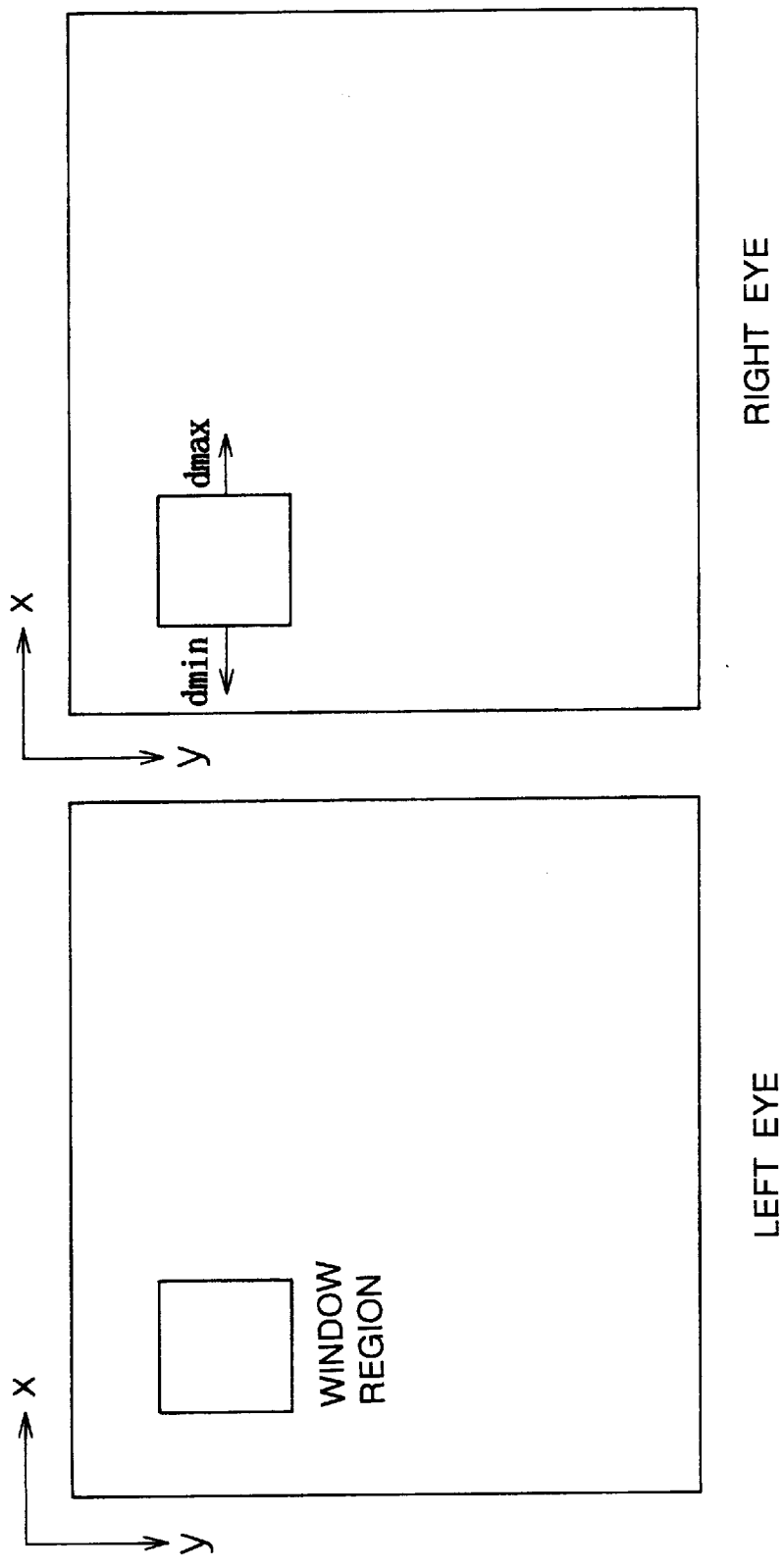
[FIG. 6] a diagram showing a case in which parallax is computed relative to a left image by block matching.

The image decoding means 1 receives multi-viewpoint image data encoded at the transmitting side and decodes the data. The left and right images decoded by the image decoding means 1 are fed to the parallax estimating means 2. The parallax estimating means 2 computes parallax at each pixel (to construct a parallax map) from the left and right images decoded by the image decoding means 1. Parallax computation by block matching using, for example, the left image as the reference will be described below with reference to FIG. 6. First, a window region is set within the left image. Next, the sum of squares of differences (SSD) shown by Mathematical Expression 4 is calculated.

[Mathematical Expression 4]

$$SSD(d) = \Sigma_{(x,y) \in W} (R(x+d, y) - L(x, y))^2$$

where (x, y) represents coordinate values within the window region set in the left image, R is a pixel value in the right image, and L is a pixel value in the left image.

In Mathematical Expression 4, the calculation is performed on a pixel-by-pixel basis for d within a range of dmin to dmax. Then, the value of d that gives the smallest SSD within the range of dmin to dmax is taken as the parallax within the set window region. The parallax at each pixel position of the image can be obtained by sequentially shifting the window region and repeating the above calculation.

Figure 7:
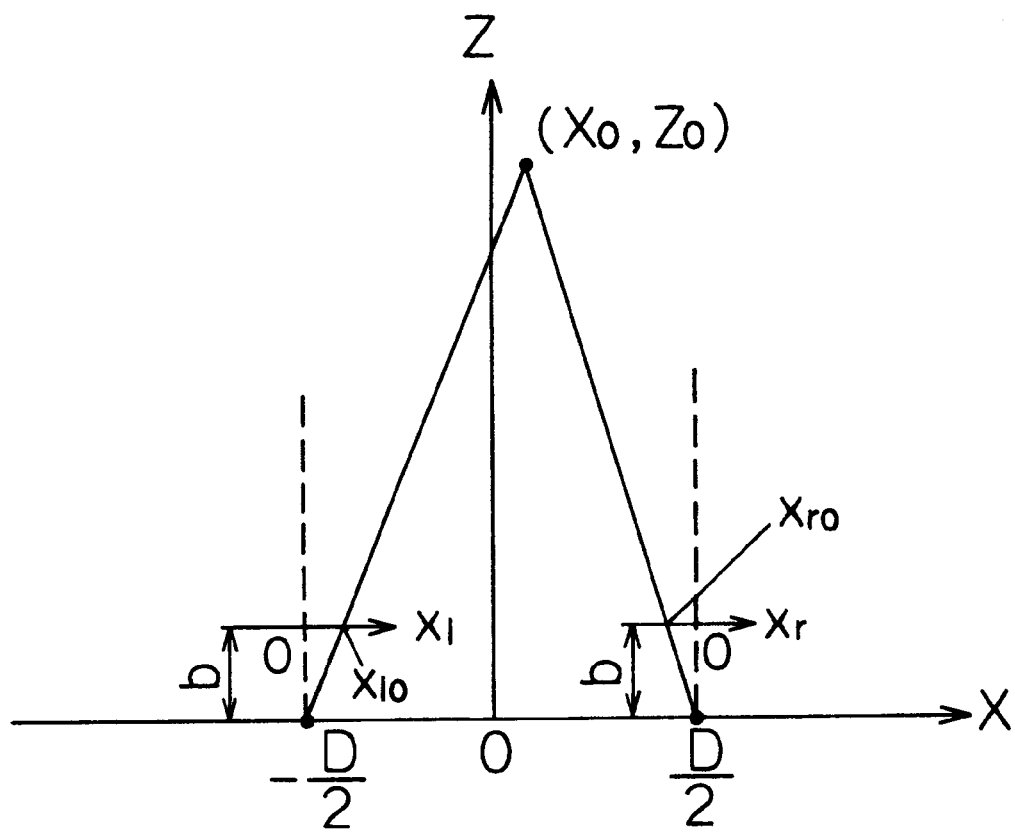
[FIG. 7] a diagram showing the case of parallel shooting.
Figure 8:
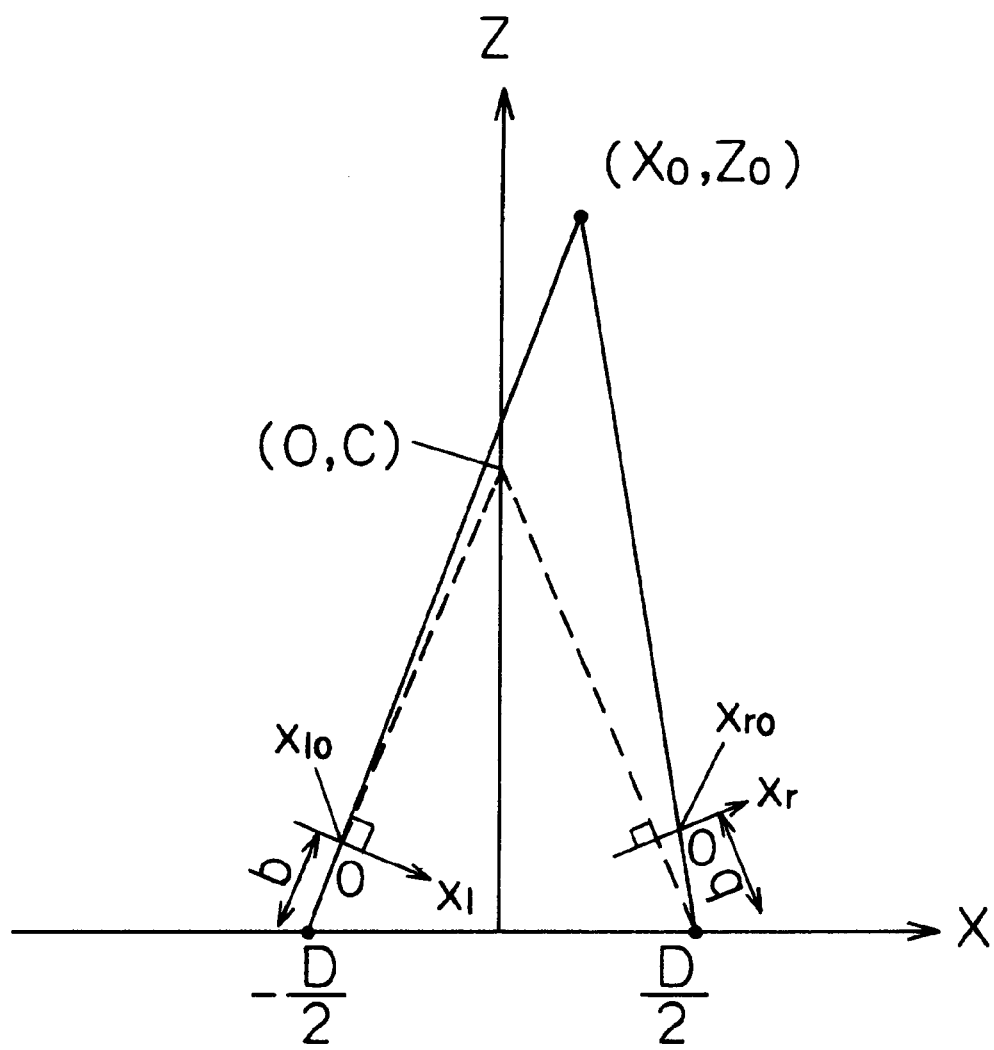
[FIG. 8] a diagram showing the case of converging shooting.

The limits dmin and dmax that define the range within which SSD is calculated can be computed from the information of the nearest and farthest points. Referring to FIGS. 7 and 8, we will explain how dmin and dmax are obtained for parallel shooting and converging shooting, respectively.

FIG. 7 shows the case of parallel shooting. In the coordinate system shown in FIG. 7, denoting the coordinates of the left and right lens centers by (−D/2, 0) and (D/2, 0), respectively, the distance between the imaging plane and the lens center by b, the horizontal coordinate of an object in three-dimensional space by X0, the coordinate in the depth-wise direction by Z0, and the horizontal positions in the left and right imaging planes where light from the object at position (X0, Z0) strikes by xl0 and xr0, respectively (xl0 and xr0 are each a horizontal coordinate in a plane coordinate system with its origin at the intersection between the camera's optical axis and the imaging plane), then from graphical relationships we have

[Mathematical Expression 5]

$$x_{l0} = \frac{X_0 + D/2}{Z_0} b$$

$$x_{r0} = \frac{X_0 - D/2}{Z_0} b$$

Hence, the parallax relative to the left image or right image is given by Mathematical Expression 6.

[Mathematical Expression 6]

$$x_{r0} - x_{l0} = \frac{-D}{Z_0} b \text{ (parallax relative to left image)}$$

$$x_{l0} - x_{r0} = \frac{D}{Z_0} b \text{ (parallax relative to right image)}$$

Here, denoting the depth value of the nearest point in the image by Zmin, and the depth value of the farthest point by Zmax, the upper limit dmax and lower limit dmin that define the range within which SSD is calculated are given by

[Mathematical Expression 7]

$$\left. \begin{array}{l} d_{\min} = \dfrac{nx}{w_{in}} \dfrac{-D}{Z_{\min}} b \\ d_{\max} = \dfrac{nx}{w_{in}} \dfrac{-D}{Z_{\max}} b \end{array} \right\} \text{relative to left image}$$

$$\left. \begin{array}{l} d_{\min} = \dfrac{nx}{w_{in}} \dfrac{D}{Z_{\max}} b \\ d_{\max} = \dfrac{nx}{w_{in}} \dfrac{D}{Z_{\min}} b \end{array} \right\} \text{relative to right image}$$

FIG. 8 shows the case of converging shooting. In the coordinate system shown in FIG. 8, denoting the coordinates of the converging point (the intersection of the optical axes of the left and right cameras) by (0, C), the coordinates of the left and right lens centers by (−D/2, 0) and (D/2, 0), respectively, the distance between the imaging plane and the lens center by b, the horizontal coordinate of an object in three-dimensional space by X0, the coordinate in the depth-wise direction by Z0, and the horizontal positions in the left and right imaging planes where light from the object at position (x0, Z0) strikes by xl0 and xr0, respectively (xl0 and xr0 are each a horizontal coordinate in a plane coordinate system with its origin at the intersection between the camera's optical axis and the imaging plane), then from graphical relationships we have

[Mathematical Expression 8]

$$x_{l0} = \frac{bD}{2C} \frac{Z_0 - (D/2 + X_0)2C/D}{Z_0 + (D/2 + X_0)D/2C}$$

$$x_{r0} = \frac{bD}{2C} \frac{Z_0 - (D/2 - X_0)2C/D}{Z_0 + (D/2 - X_0)D/2C}$$

Hence, the parallax relative to the left image or right image is given by

[Mathematical Expression 9]

$$x_{r0} - x_{l0} = \frac{bD}{2C} \left( \frac{Z_0 - (D/2 - X_0)2C/D}{Z_0 + (D/2 - X_0)D/2C} + \frac{Z_0 - (D/2 + X_0)2C/D}{Z_0 + (D/2 + X_0)D/2C} \right)$$

(parallax relative to left image)

$$x_{l0} - x_{r0} = \frac{bD}{2C} \left( \frac{Z_0 - (D/2 + X_0)2C/D}{Z_0 + (D/2 + X_0)D/2C} + \frac{Z_0 - (D/2 - X_0)2C/D}{Z_0 + (D/2 - X_0)D/2C} \right)$$

(parallax relative to right image)

Since X0 remains in each equation of Mathematical Expression 9, it can be seen that the parallax differs depending on the position in the horizontal direction even if the depthwise position is the same (this means a distortion in the reproduced stereoscopic image). Here, let us consider parallax at a point on X0=0 (that is, on the Z axis) for simplicity. Substituting X0=0 into Mathematical Expression 9, we have

[Mathematical Expression 10]

$$x_{r0} - x_{l0} = \frac{bD}{C} \frac{Z_0 - C}{Z_0 + D^2/4C} \quad \text{(parallax relative to left image)}$$

$$x_{l0} - x_{r0} = \frac{bD}{C} \frac{C - Z_0}{Z_0 + D^2/4C} \quad \text{(parallax relative to right image)}$$

From Mathematical Expression 10, the upper limit pixel count dmax and lower limit pixel count dmin of parallax can be determined based on the positional relationship between the depth value Zmin of the nearest point in the image, the depth value zmax of the farthest point, and the depth value C of the converging point, and on the horizontal pixel count nx and the width win of the imaging surface (CCD).

When considering parallax at points other than those on the Z axis, the upper limit dmax and lower limit dmin parallax can be determined by calculating the maximum and minimum values of Mathematical Expression 9.

As described above, when the depth value of the nearest point in an image, the depth value of the farthest point, the camera position, and the orientation of the camera's optical axis are given, the range of values that the parallax is to take can be calculated, and thus the range within which SSD is calculated for the computation of parallax can be determined. The average parallax computing means 3 computes the average of the parallax map computed by the parallax estimating means 2. The average of the parallax map is obtained by calculating the equation in Mathematical Expression 11.

[Mathematical Expression 11]

$$\bar{d} = \frac{\int_A d(x,y) dx\, dy}{\int_A dx\, dy}$$

where A denotes the region where parallax is calculated.

The image shifting means 4a and 4b shift the images so that the depthwise point having the average parallax computed by the average parallax computing means 3 will be displayed at the same depthwise position as the display surface (that is, the parallax becomes zero at the plane of the display surface).

In FIG. 1 showing the display produced by the parallel projection, A is the depth of the nearest point in the displayed image, B is the depth of the farthest point, and C is the depth of the average parallax. From FIG. 1, it can be seen that in the parallel projection, when there is a parallax of Dc shown by Mathematical Expression 12 between the left and right images, the parallax becomes zero at the plane of the screen, thus producing a natural-looking display with the convergence and accommodation coinciding with each other.

[Mathematical Expression 12]

$$a : \frac{E}{2} = b : \frac{D_c}{2} \quad \text{Hence } D_c = \frac{Eb}{a}$$

The image shifting means 4a shifts the left image by the shift amount shown by Mathematical Expression 13 (a positive value means a shift to the right).

[Mathematical Expression 13]

$$\text{shift} = \bar{d} + \frac{nx}{w_{out}} \frac{D_c}{2} \quad \text{(Left image)}$$

The image shifting means 4b shifts the right image in the opposite direction by the same amount. As a result of the shifting performed by the image shifting means 4a and 4b, the point having the average parallax is displayed at the same depthwise position as the screen.

In FIG. 3 showing the display produced by the converging projection, A is the depth of the nearest point in the displayed image, B is the depth of the farthest point, and C is the depth of the average parallax. In the case of the converging projection, the image will be displayed at the same depthwise position as the screen when the parallax is zero at the center of the image. Accordingly, in the case of converging projection, the image shifting means 4a and 4b shift the left and right images each by an amount equal to the average parallax value multiplied by −½.

As described above, according to the present embodiment, when transmitting multi-viewpoint images, by appending information concerning the nearest point and farthest point in the image a display that alleviates eye strain (with parallax controlled) can be presented at the display side.

Furthermore, by transmitting an image with information appended thereto concerning the size of the camera's imaging surface (CCD), the distance from the imaging surface to the lens center, and the focal length of the lens, when producing a display that matches the view angle at the time of shooting, the view angle at the time of shooting can be calculated with good accuracy at the display side even for an image photographed close to the subject.

When transmitting multi-viewpoint images without appending the information concerning the nearest and farthest points in the image, instead of the information concerning the nearest and farthest points a special code indicating that the information concerning the nearest and farthest points is not appended may be appended to the transmitted image; in that case, the parallax at the nearest point and farthest point in the image can be estimated at the display side by computing the parallax within a predetermined range. This arrangement also is embraced in the present invention.

Furthermore, when the information concerning the nearest and farthest points in the multi-viewpoint images is set as specific depth values at the transmitting side, parallax control can be performed so that the parallax within the thus set depth range comes inside the fusing range. This also falls within the scope of the present invention.

The present embodiment has dealt with an example in which the parallax computation is performed at the display side, but instead, the parallax incorporated in the encoded image may be used. This arrangement also falls within the scope of the present invention. One such example will be described below with reference to FIG. 10.

Figure 10:
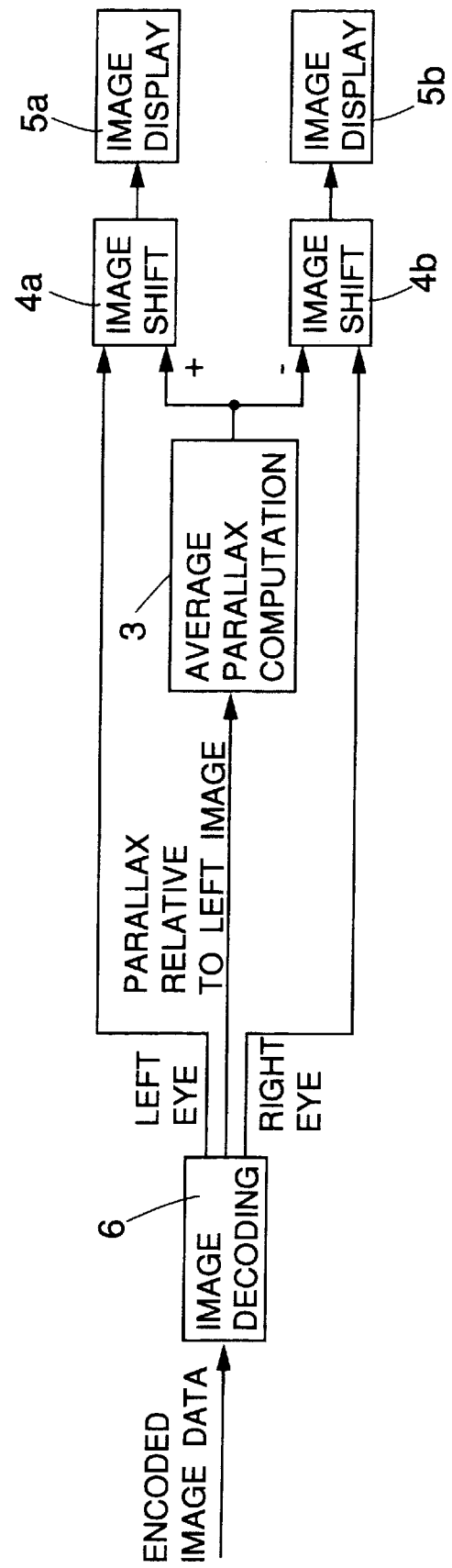
[FIG. 10] a diagram showing the operation of image decoding means.

In FIG. 10, the operation of the component elements other than the image decoding means 6 is the same as that of the parallax control method shown in FIG. 5, and descriptions of such elements will not be repeated here. The following description deals only with the operation of the image decoding means 6. The image decoding means 6 decodes the encoded image data and outputs the left and right images and parallax relative to the left image. When transmitting binocular images using an MPEG-2 multi-viewpoint image transmission method, the compression ratio is increased by performing parallax compensation relative to the left image. Since parallax is derived from the encoded image data, there is no need to compute the parallax at the display side, and the amount of computation at the display side can thus be reduced.

The average parallax computing means 3 which computes the average parallax may be configured to compute a weighted average value by Mathematical Expression 14 with greater emphasis on the center of the screen. In this way, parallax control can be performed that makes it easier to achieve fusion at the center of the image. This arrangement also is embraced in the present invention.

[Mathematical Expression 14]

$$\frac{\int_A w(x, y)d(x, y)dxdy}{\int_A w(x, y)dxdy}$$

where A denotes the region where parallax is calculated.

Figure 9:
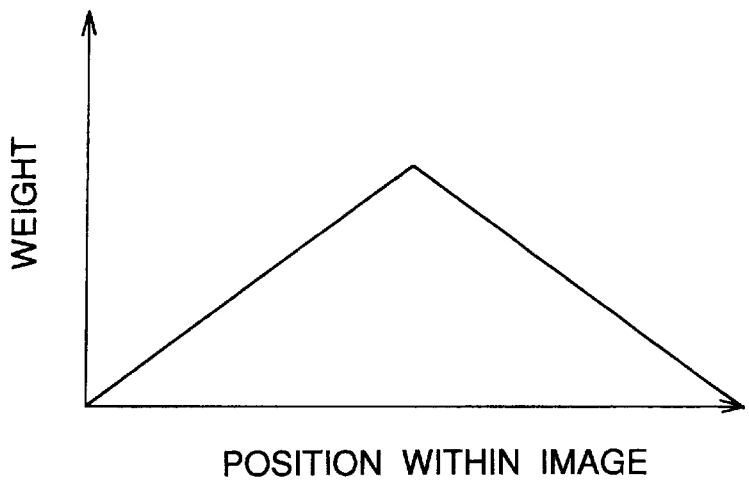
[FIGS. 9(a) to 9(c) are diagrams showing examples of weight distributions used for the calculation of a weighted average by Mathematical Expression 14.
Figure 9:
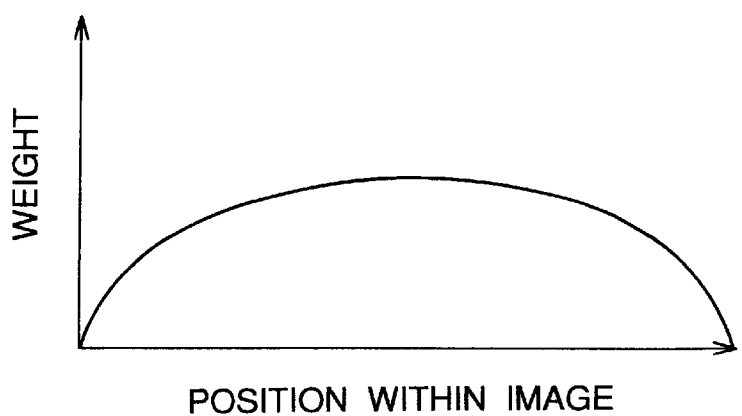
Figure 9:
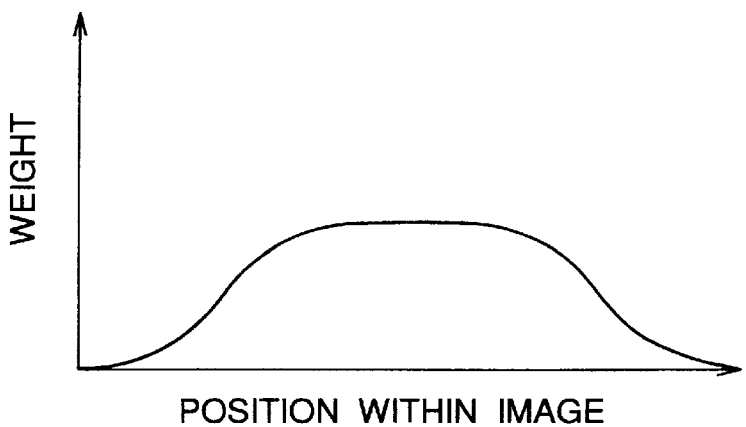

Parts (a), (b), and (c) of FIG. 9 show examples of weight distributions used for the calculation of the weighted average by Mathematical Expression 14. Each part shows a one-dimensional distribution for simplicity, but in actuality, the distribution is two-dimensional with greater values near the center of the image than the edges thereof. All weight values are greater than or equal to 0 (nonnegative values).

(Embodiment 2)

Figure 11:
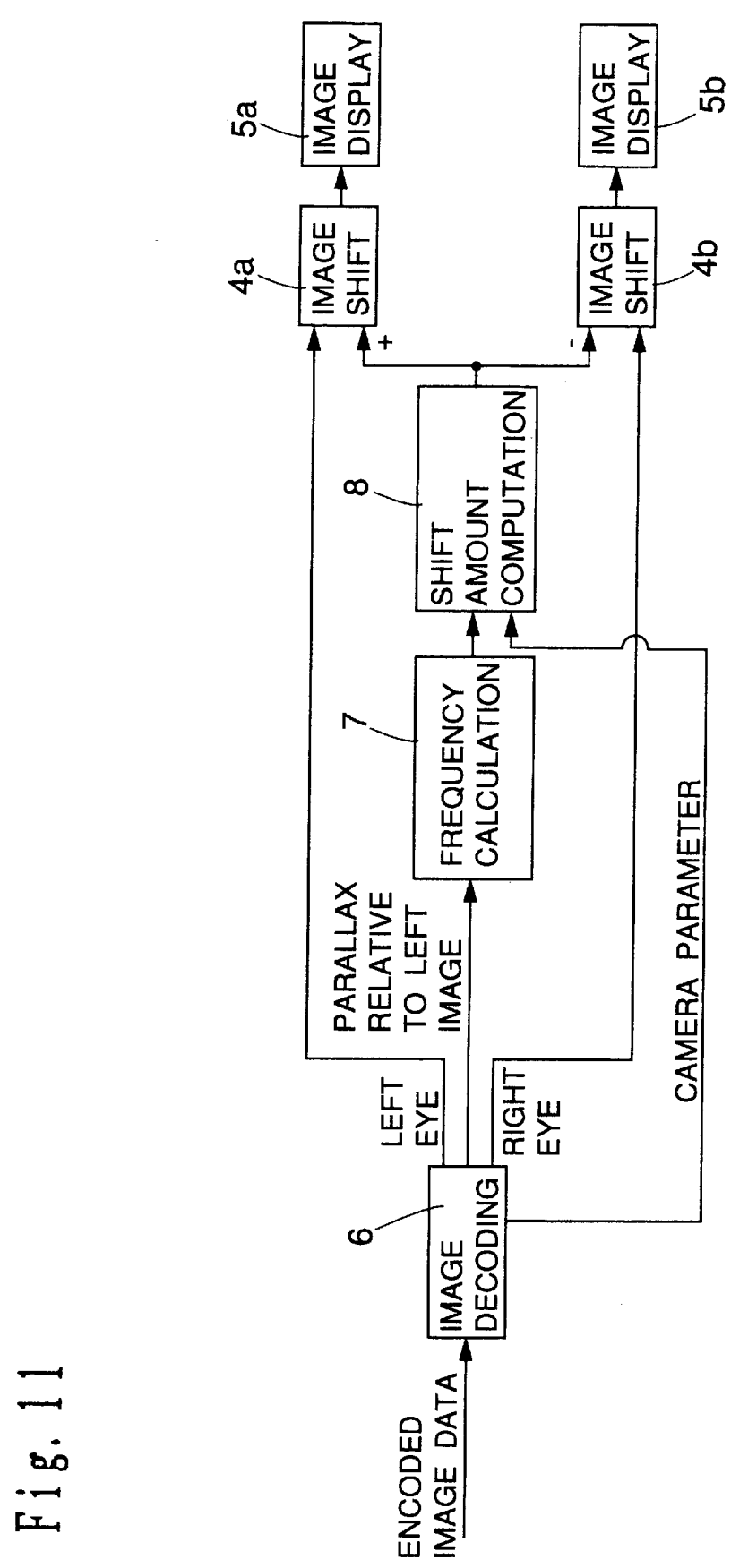
[FIG. 11] a block diagram for a parallax control method according to a second embodiment of the present invention.

FIG. 11 is a block diagram for a parallax control method according to a second embodiment of the present invention. In FIG. 11, component elements, other than a frequency calculating means 7 and a shift amount computing means 8, are the same in operation as the corresponding elements in the first embodiment; therefore, such elements are designated by the same reference numerals as those used in the diagram illustrating the first embodiment, and descriptions thereof will not be repeated here. The operation of the frequency calculating means 7 and shift amount computing means 8 will be described below.

The frequency calculating means 7 calculates the frequency of the parallax measured relative to the left image and decoded by the image decoding means 6. The frequency of the parallax means numbers of pixels which is calculated for every each parallax value within a certain area of the image (for example entire image area or a specified image area which is determined by a specific rule). The shift amount computing means 8 computes, from the frequency of parallax (between the images) calculated by the frequency calculating means 7 and the fusing range of human eyes determined according to the view angle of the images, the shift amount that maximizes the sum of parallax frequencies within the fusing range, and outputs the result to the image shifting means 4a and 4b.

Figure 12:
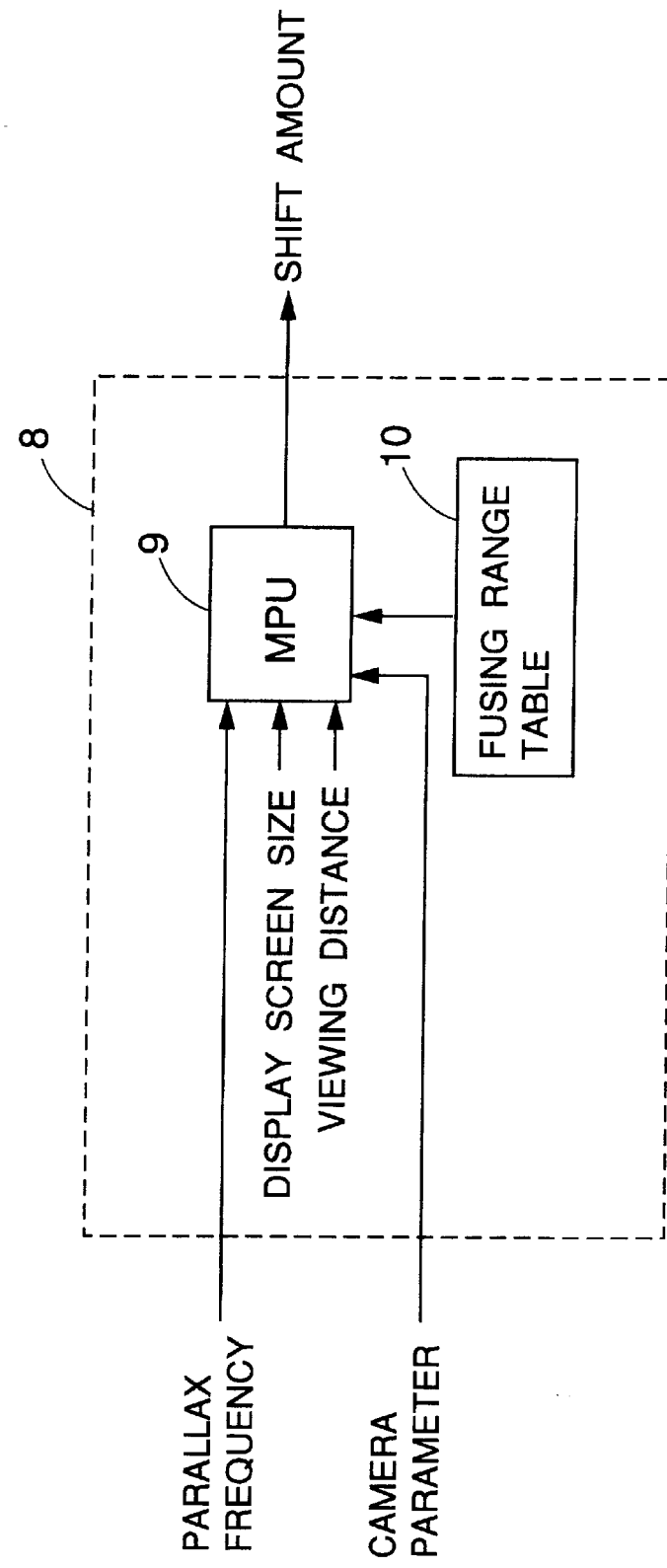
[FIG. 12] a diagram showing one example of the configuration of shift amount computing means.

FIG. 12 shows one example of the configuration of the shift amount computing means 8. In FIG. 12, reference numeral 9 is an MPU and 10 is a fusing range table. The MPU 9 computes a horizontal view angle from the width of the image display surface and the viewing distance, as shown by Mathematical Expression 15, and reads the fusing range for that view angle from the fusing range table 10.

[Mathematical Expression 15]

$$2\operatorname{Tan}^{-1}\frac{W_{out}}{2L}$$

where $W_{out}$ is the width of the image display surface, and L is the viewing distance.

Figure 13:
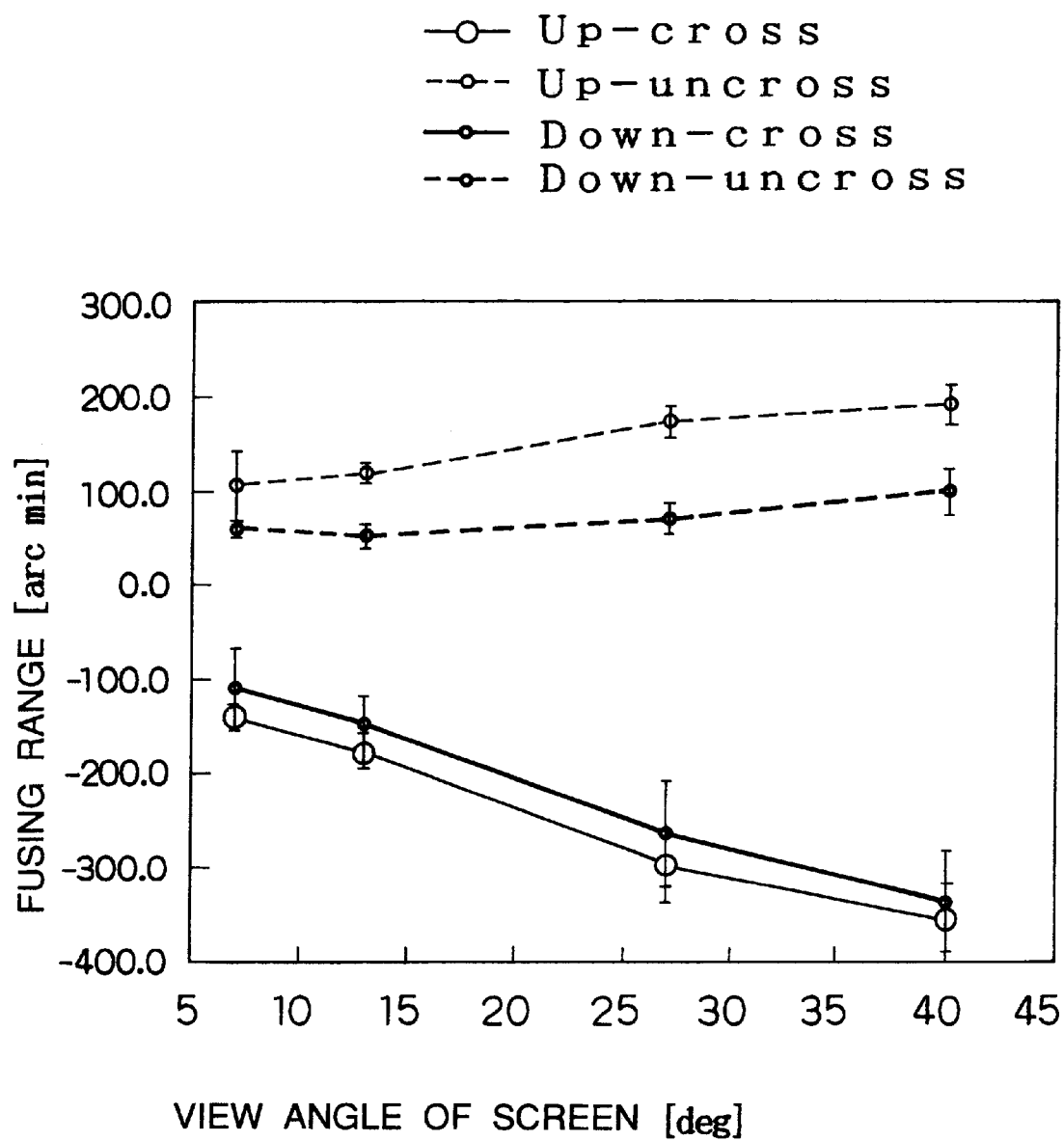
[FIG. 13] a characteristic diagram of a fusing range table.

FIG. 13 shows one example of the characteristic of the fusing range table. In FIG. 13, the horizontal axis represents the view angle in the horizontal direction of the image display surface, and the vertical axis represents the parallax fusing range (converted to angle by Mathematical Expression 16).

[Mathematical Expression 16]

$$\theta = 2\operatorname{Tan}^{-1}\frac{\Delta}{2L}$$

where e is the parallax converted to angle, $\Delta$ is the parallax on the image display surface, and L is the viewing distance.

Figure 14:
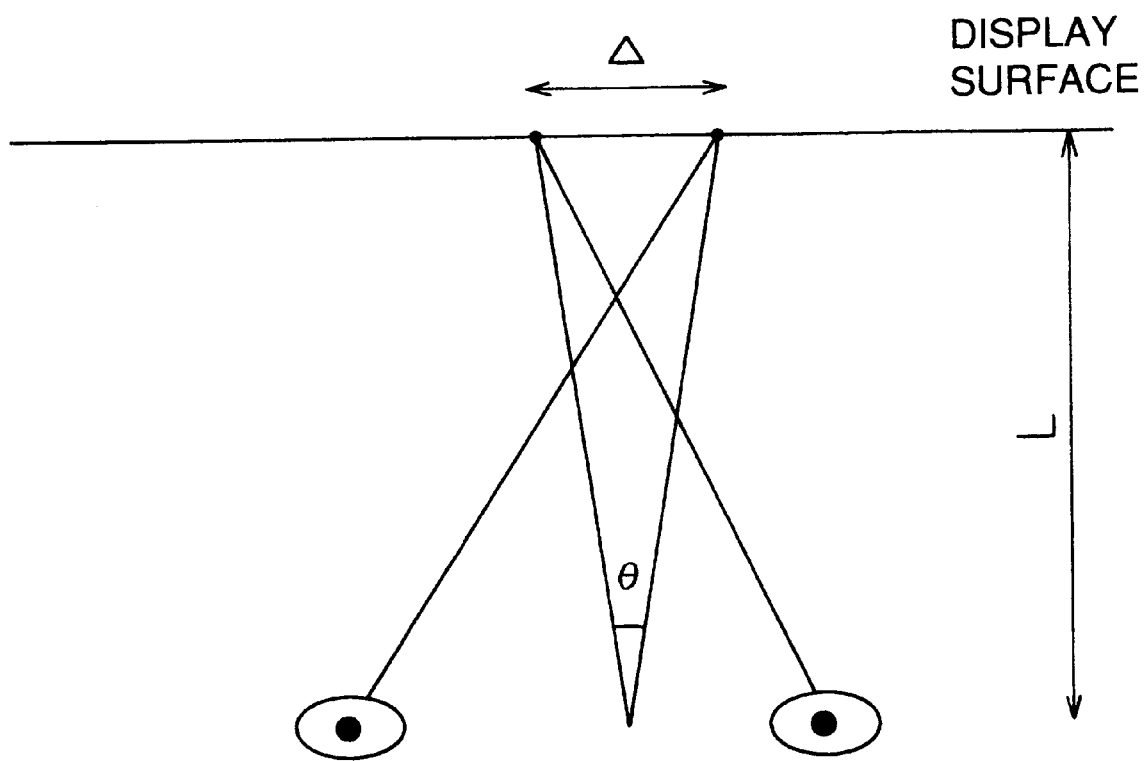
[FIG. 14] a diagram giving a graphical representation of Mathematical Expression 16.

In FIG. 13, the negative sign on the vertical axis shows the parallax with which the image is perceived as being located forwardly of the display screen, and the positive sign indicates the parallax with which the image is perceived as being located behind the display screen. FIG. 14 is a diagram giving a graphical representation of Mathematical Expression 16. FIG. 14 shows that the angle-converted parallax $\theta$ represents the parallax A on the image display screen converted to the view angle.

On the other hand, in the case of the parallel projection and converging projection shown in FIGS. 1 and 3, respectively, the positions x11, xr1 of images (for example, pixel positions on liquid-crystal panels in the case of liquid-crystal projectors) are related to the positions X1, Xr on the display surface by Mathematical Expression 17 and Mathematical Expression 19, respectively. The parallaxes on the display surface are as shown by Mathematical Expression 18 and Mathematical Expression 20.

[Mathematical Expression 17]

$$x_l = \frac{a}{b}x_{ll} - \frac{E}{2}$$

$$x_r = \frac{a}{b}x_{rl} + \frac{E}{2}$$

[Mathematical Expression 18]

$$X_r - X_l = \frac{a}{b}(x_{rl} - x_{ll}) + E \quad \text{(parallax relative to left image)}$$

$$X_l - X_r = \frac{a}{b}(x_{ll} - x_{rl}) - E \quad \text{(parallax relative to right image)}$$

[Mathematical Expression 19]

$$X_l = \sqrt{a^2 - E^2/4}\,\frac{Eb + 2\sqrt{a^2 - E^2/4}\,x_{ll}}{2b\sqrt{a^2 - E^2/4} - Ex_{ll}}$$

$$X_r = \frac{E}{2} - \sqrt{a^2 - E^2/4}\,\frac{Eb - 2\sqrt{a^2 - E^2/4}\,x_{rl}}{2b\sqrt{a^2 - E^2/4} + Ex_{rl}}$$

[Mathematical Expression 20]

$$X_r - X_l =$$

$$\frac{E}{2} - \sqrt{a^2 - E^2/4}\left(\frac{Eb - 2\sqrt{a^2 - E^2/4}\,x_{rl}}{2b\sqrt{a^2 - E^2/4} + Ex_{rl}} - \frac{Eb + 2\sqrt{a^2 - E^2/4}\,x_{ll}}{2b\sqrt{a^2 - E^2/4} - Ex_{ll}}\right)$$

(parallax relative to left image)

-continued $$X_l - X_r = \sqrt{a^2 - E^2/4}\left(\frac{Eb - 2\sqrt{a^2-E^2/4}\,x_{rl}}{2b\sqrt{a^2-E^2/4}+Ex_{rl}} - \frac{Eb+2\sqrt{a^2-E^2/4}\,x_{ll}}{2b\sqrt{a^2-E^2/4}-Ex_{ll}}\right) - \frac{E}{2}$$

(parallax relative to right image)

The coordinate values (x10, y10), (xr0, yr0) on the imaging surfaces at the time of shooting and the positions (x11, y11), (xr1, yr1) of the images at the time of projection (for example, pixel positions on liquid-crystal panels in the case of liquid-crystal projectors) are related by Mathematical Expression 21.

[Mathematical Expression 21]

$$x_{ll} = \frac{w_{out}}{w_{in}} x_{l0} \qquad y_{ll} = \frac{w_{out}}{w_{in}} y_{l0}$$

$$x_{rl} = \frac{w_{out}}{w_{in}} x_{r0} \qquad y_{rl} = \frac{w_{out}}{w_{in}} y_{r0}$$

Here, the width win of the imaging surface is obtained from a camera parameter, and the image width wout at the time of display is a value unique to the display system.

The values of x10 and xr0 are calculated using Mathematical Expression 5 or Mathematical Expression 8 depending on the shooting condition (parallel shooting or converging shooting), and converted to x11 and xr1 by Mathematical Expression 21. Further, Mathematical Expression 18 or Mathematical Expression 20 is calculated depending on the projection condition (parallel projection or converging projection). In this way, the parallax on the display screen can be calculated by considering both the shooting and projection conditions.

Figure 15:
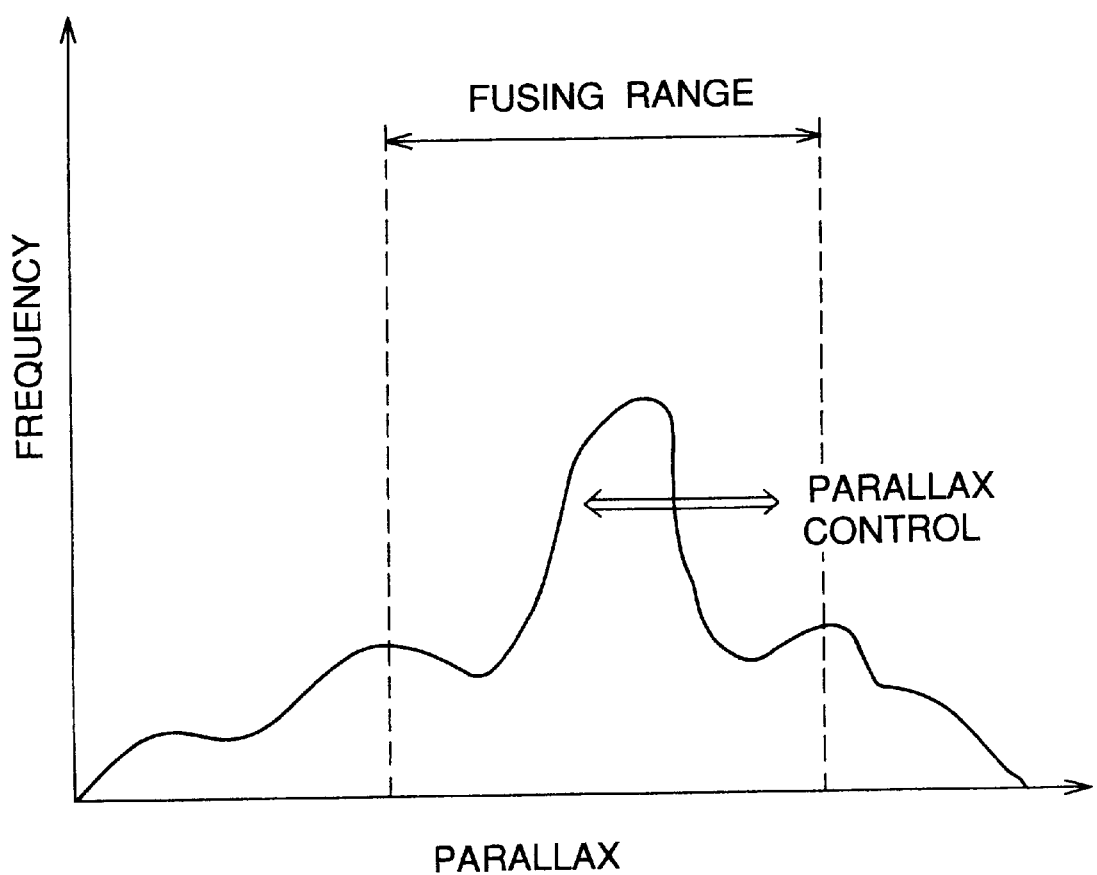
[FIG. 15] a parallax frequency distribution diagram.

The MPU 9 converts the fusing range, read out of the fusing range table 10, into the parallax (distance) on the display screen, and determines the parallax fusing range on the image display screen. Then, using the above-described relationship between the parallax incorporated in the image data and the parallax on the image display screen, the MPU 9 computes the shift amount for the image data that maximizes the sum of parallax frequencies within the fusing range (shifting the image by parallax control means shifting the parallax frequency distribution in FIG. 15 in a horizontal direction).

The image shifting means 4a and 4b shift the respective images by the thus determined shift amount in opposite directions to each other, and the images are displayed by the image display means 5a and 5b. In this way, a display can be presented that maximizes the sum of parallax frequencies within the fusing range (maximizes the pixel area where fusion can be achieved within the image).

As described above, according to the present embodiment, by performing parallax control according to the fusing range of human eyes, the parallax can be brought within the fusing range in as many portions of the image as possible when displayed.

In the present embodiment, the description has dealt with the parallax control that maximizes the sum of parallax frequencies within the fusing range, but it will be appreciated that approximately the same effects can be obtained if the parallax is controlled so that the average value of the parallax is brought to the center of the fusing range. Such control also falls within the scope of the present invention.

Furthermore, at the transmitting side, the nearest point and farthest point to be appended to transmitted information may be set at values different from the nearest point and farthest point in the actual image, and at the display side, the parallax may be controlled so that the average value of the parallaxes corresponding to the nearest point and farthest point represented by the thus set values is brought to the center of the fusing range, thus enabling an image at the depth intended by the image creator to be preferentially presented to the viewer. Such control also is embraced in the present invention.

(Embodiment 3)

In a third embodiment of the present invention, a pair of images are input, initial parallax and the reliability of the initial parallax are computed, an object's contour line is detected from the base image and the reliability of the initial parallax, and parallax at a region near the object's contour line where the reliability of the initial parallax is low is determined from the initial parallax, the reliability of the initial parallax, and the detected object's contour line. At this time, the parallax is determined in such a manner as to change across the object's contour line and connect smoothly with surrounding parallax. The third embodiment concerns a parallax estimation method and apparatus for implementing such control.

With the above-described configuration of the present embodiment, the initial parallax and the reliability of the initial parallax are computed from the pair of images consisting of the base image and reference image, the object's contour line is detected from the base image and the reliability of the initial parallax, and the parallax at a region near the object's contour line where the reliability of the initial parallax is low is determined from the initial parallax, the reliability of the initial parallax, and the detected object's contour line so that the parallax changes across the object's contour line and connects smoothly with surrounding parallax.

Figure 16:
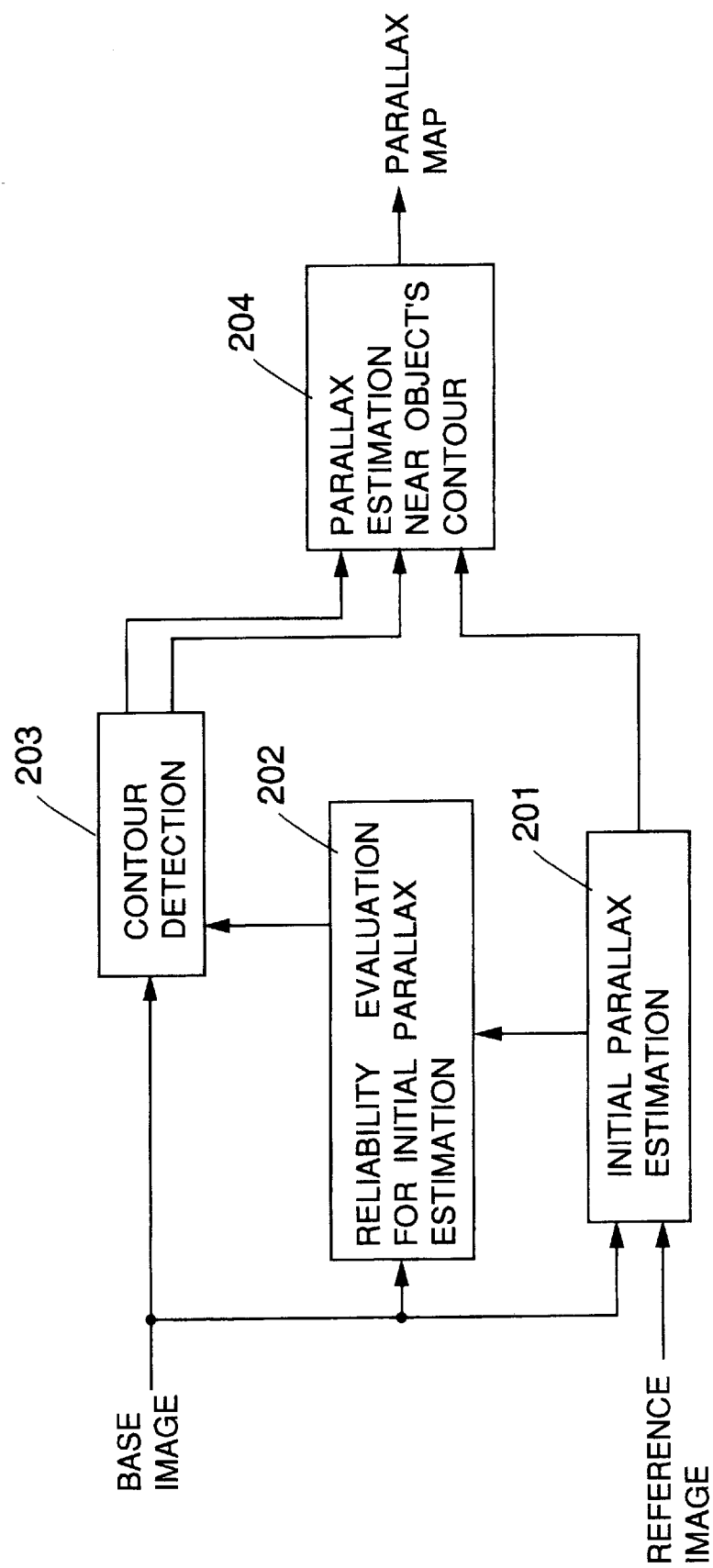
[FIG. 16] a diagram showing the configuration of a parallax estimation apparatus according to a third embodiment of the present invention.

FIG. 16 is a block diagram of the parallax estimation apparatus according to the third embodiment of the present invention.

In FIG. 16, reference numeral 201 is an initial parallax estimating section for calculating initial parallax by block matching, 202 is a reliability evaluation section for the initial parallax estimation, 203 is a contour detecting section, and 204 is a parallax estimating section for estimating parallax near an object's contour.

The operation of the above configuration will be described below.

The initial parallax estimating section 201 calculates the sum of squares of differences (SSD) shown by Mathematical Expression 22. The value of SSD calculated by Mathematical Expression 22 is small when the distribution of pixel values in the window region set within the base image is similar to that in the window region set within the reference image, and is large when the distribution of pixel values is different between the two window regions. The initial parallax estimating section 201 determines the amount, d, of displacement between the images that minimizes the SSD value within a prescribed search range as the parallax at an attention point (x, y), and outputs the value of the parallax to the parallax estimating section 204 for the estimation of parallax near the object's contour, and the minimum value of SSD within the search range to the reliability evaluation section 202 for the initial parallax estimation.

[Mathematical Expression 22]

$$SSD = \sum_{x,y \in W} (I_{ref}(x+d, y) - I_{base}(x, y))^2$$

where $I_{ref}()$ and $I_{base}()$ are pixel values in the reference image and base image, respectively, and W is the region within a block for which SSD is calculated.

Figure 17:
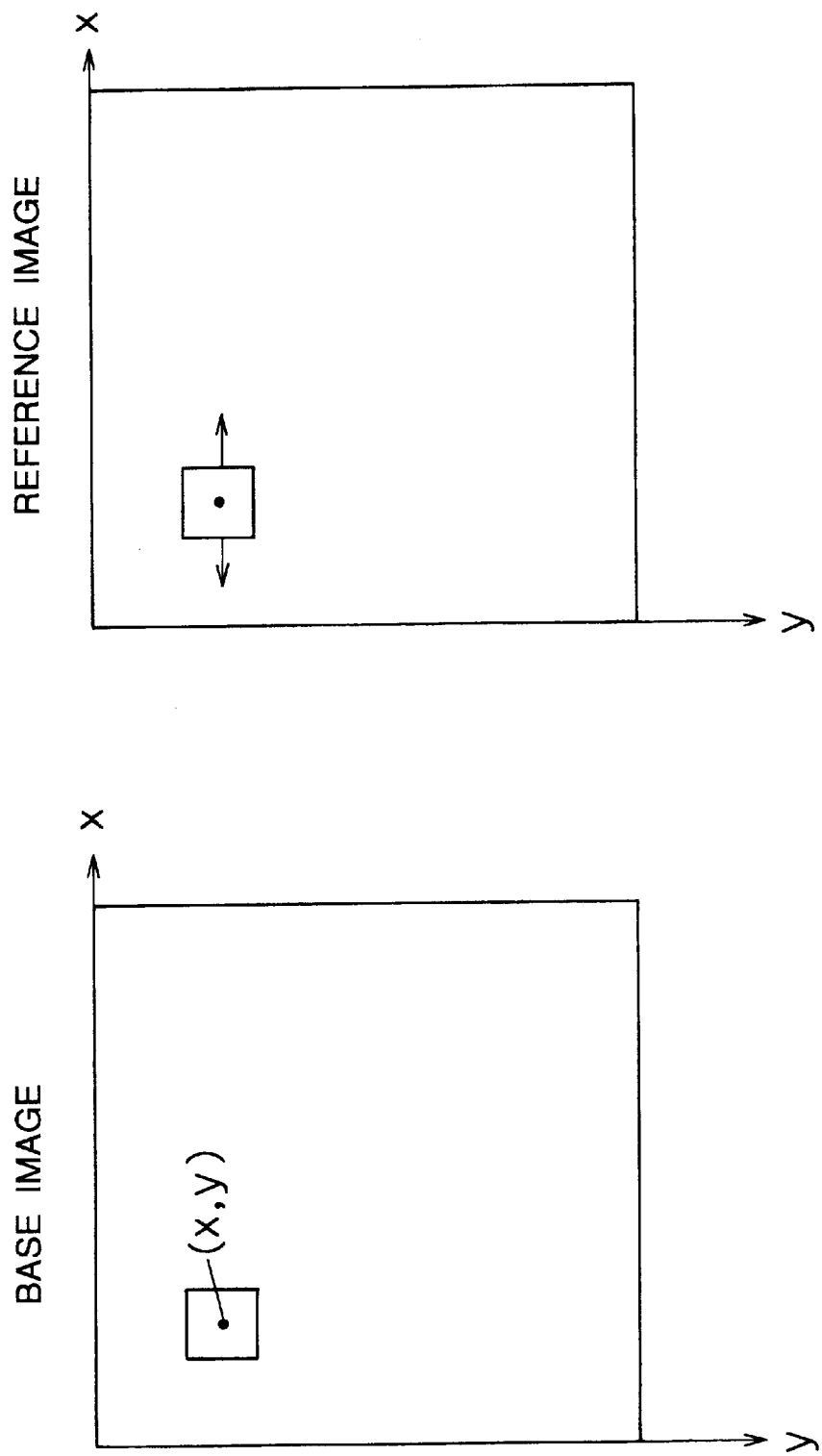
[FIG. 17] a diagram showing block matching according to the same embodiment.

FIG. 17 is a diagram for explaining the above initial parallax estimation (block matching) performed by the initial parallax estimating section 201. In FIG. 17, the window region centered at the attention point (x, y) is the integrating region W in Mathematical Expression 22. By sequentially shifting the window region, and by repeating the calculation of SSD, initial parallax over the entire image can be obtained.

The reliability evaluation section 202 for the initial parallax estimation computes a reliability evaluation value having the relation shown by Mathematical Expression 23, using the minimum value of SSD within the search range obtained as a result of the parallax computation by the initial parallax estimating section 201, the number of pixels in the window region (block), the variance of noise between the images, and the average values of squares of luminance gradients in the horizontal and vertical directions of the base image within the window region.

(Mathematical Expression 23)

$$J = \frac{|SSD_{min}/N - 2\sigma_n^2|}{\overline{f_x^2} + \overline{f_y^2}}$$

where $SSD_{min}$ is the minimum value of the SSD within the search range, N is the number of pixels in the block, $2\sigma_n^2$ is the variance of noise between the images, and $\overline{f_x^2}$ and $\overline{f_y^2}$ are the averages of squares of luminance gradients in the horizontal and vertical directions within the block in the base image.

The smaller the value of Mathematical Expression 23, the higher the reliability of the parallax estimation, and the larger the value, the lower the reliability.

Figure 18:
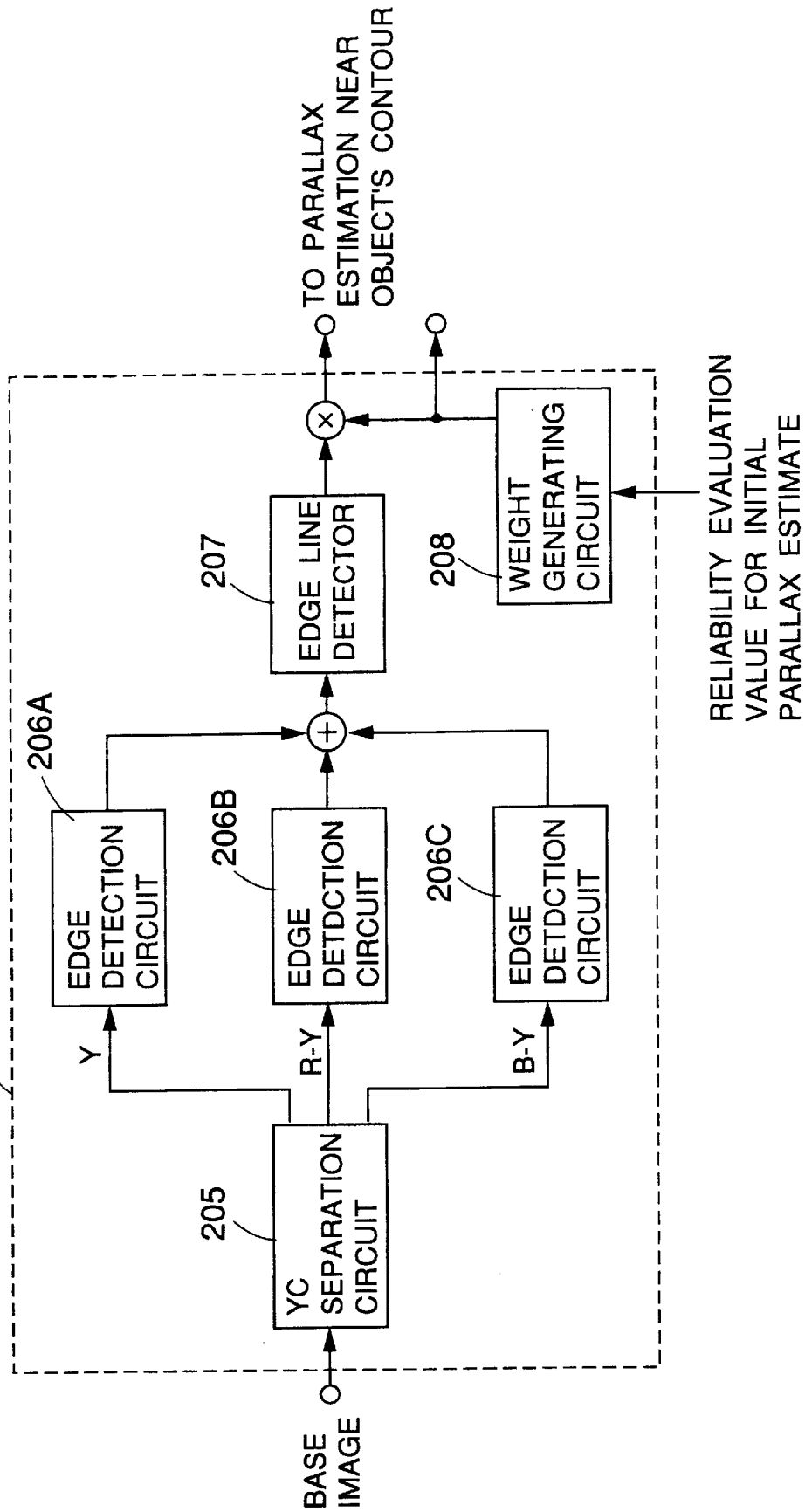
[FIG. 18] a diagram showing the configuration of a contour detecting section according to the same embodiment.

FIG. 18 is a block diagram showing one example of the configuration of the contour detecting section 203. In FIG. 18, reference numeral 205 is a YC separation circuit for separating the base image into luminance and color components, 206A, 206B, and 206C are edge detection circuits for detecting edges from the thus separated luminance component Y and the color components R-Y and B-Y, respectively, and 207 is an edge line detecting section for outputting only the intensity of edge lines obtained as a result of the edge detection, and 208 is a weight generating circuit for outputting a weight 1 for regions where the reliability of the initial parallax estimate is low, and a weight 0 for regions where the reliability of the initial parallax estimate is high.

The operation of the above configuration will be described below.

The YC separation circuit 205 separates the base image into the luminance component Y and color components R-Y and B-Y for output.

Figure 19:
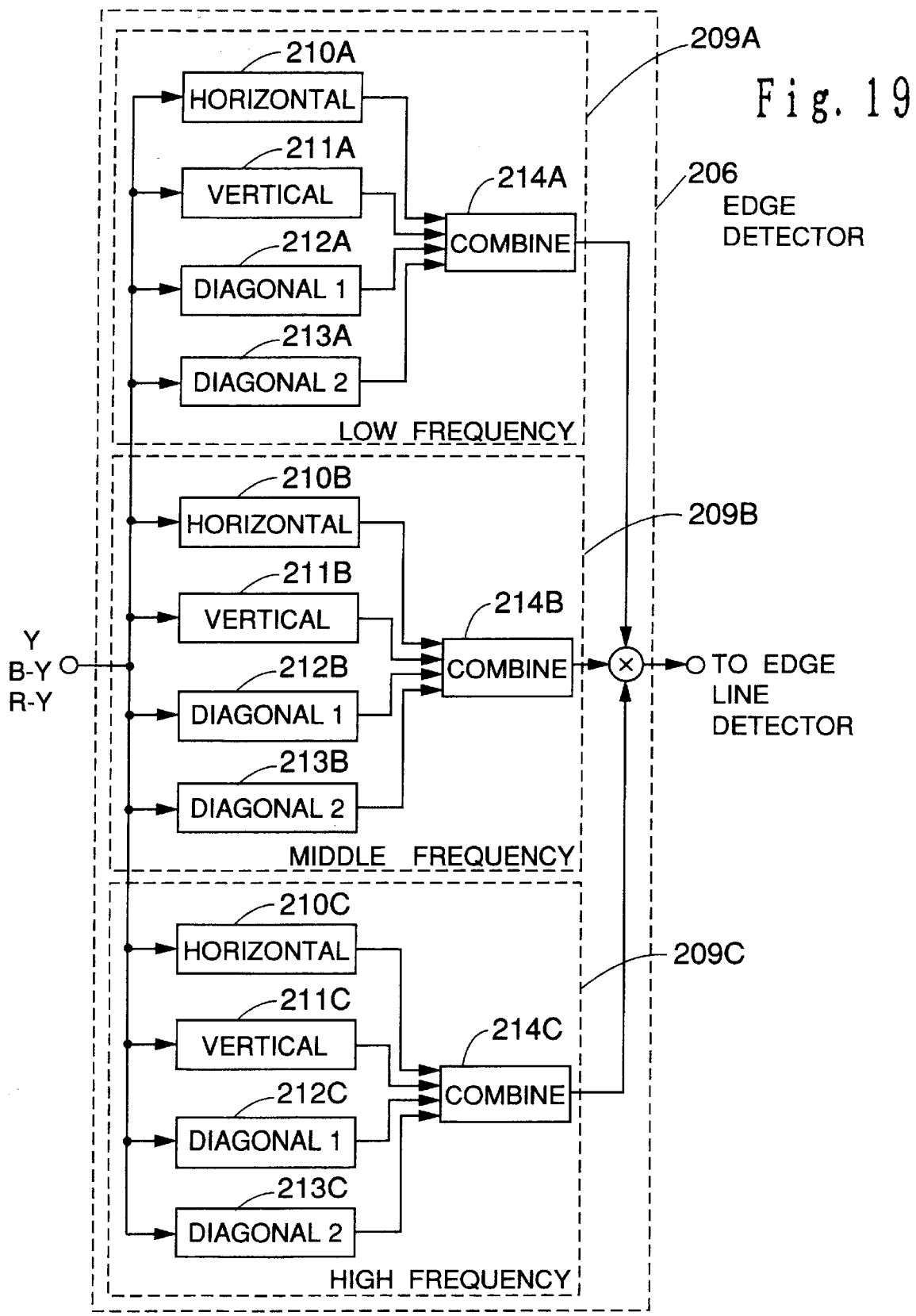
[FIG. 19] a diagram showing one example of the configuration of an edge detecting section according to the same embodiment.
Figure 20:
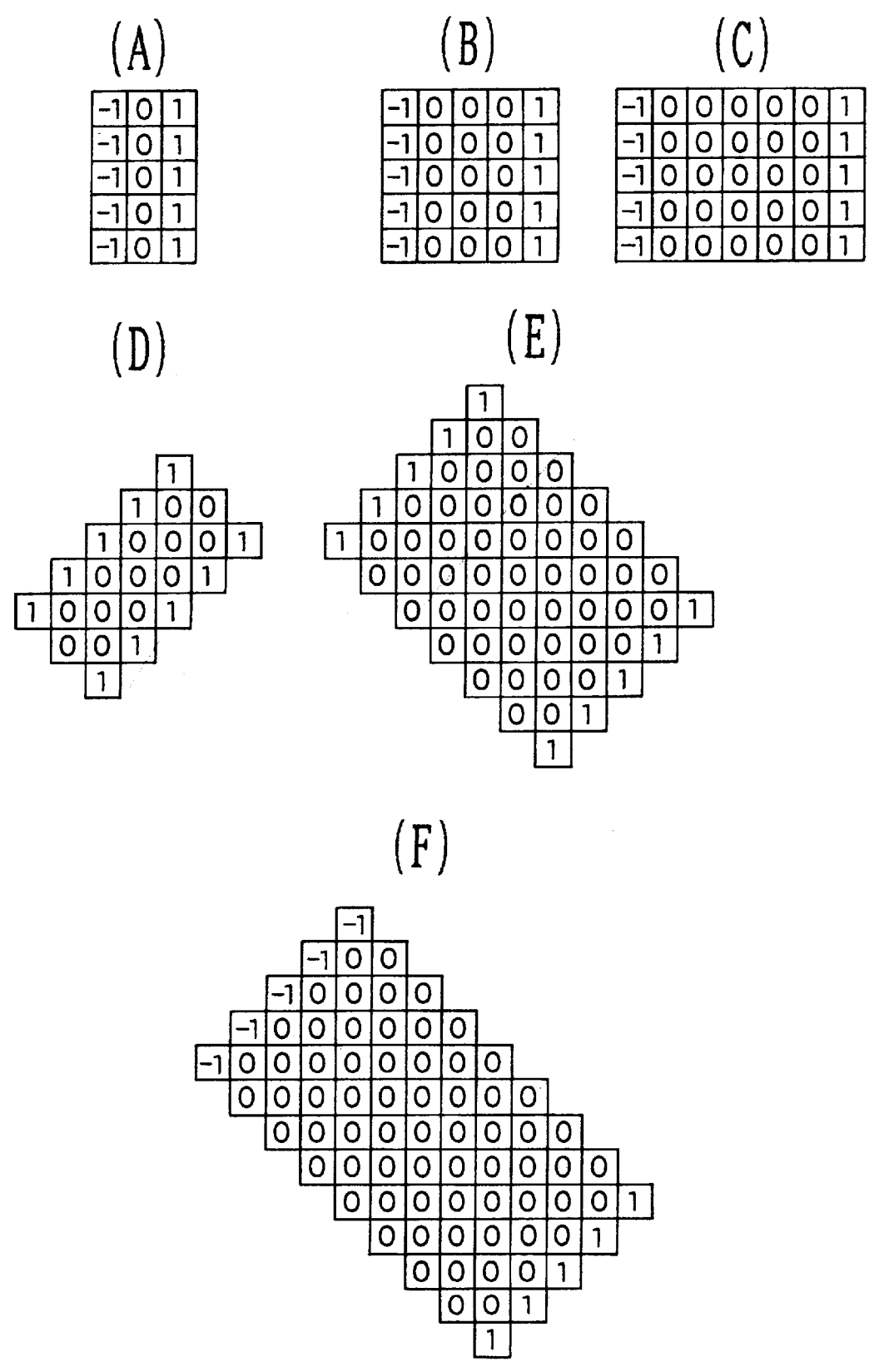

The edge detection circuit 206A, 206B, and 206C detect edge components from the Y, R-Y, and B-Y components, respectively. FIG. 19 is a block diagram showing one example of the configuration of the edge detection circuit 206. In FIG. 19, reference numerals 209A, 209B, and 209C are direction-selective filter arrays for detecting edge components in the low spatial frequency region, middle spatial frequency region, and high spatial frequency region, respectively. Reference numerals 210, 211, 212, and 213 are direction-selective filters constituting the direction-selective filter arrays. FIG. 20 shows examples of spatial weighting of the direction-selective filters. Parts (a), (b), and (c) of FIG. 20 are for detecting edges continuous in a vertical direction, and (d), (e), and (f) are for detecting edges in a diagonal direction.

Parts (a) and (d) are examples of weight distribution for the high spatial frequency region, (b) and (e) for the middle spatial frequency region, and (c) and (f) for the low spatial frequency region. Edge detection in the horizontal direction and in the other diagonal direction can be achieved by rotating the weight coefficient arrangements through 90 degrees. The edge detection directions need not necessarily be set 45 degrees apart, but may be set, for example, 30 degrees apart.

The spatial weighting distributions for the direction-selective filters are not limited to those shown in FIG. 20, but other distributions are also possible as long as the weights are so distributed as to differentiate along each direction. The method of edge intensity calculation for each direction is shown in the form of an equation in Mathematical Expression 24.

[Mathematical Expression 24]

$$E_{dir}(x, y) = \frac{\sum W_t(i, j) P(x+i, y+i)}{\sum W_t(i, j)}$$

where $E_{dir}$ is the edge intensity in each direction, $W_t$ is a filter weight an example of which has been shown in FIG. 20, P is the pixel value of the luminance or color component, and i,j are coordinates of filter coefficients shown in FIG. 20.

A combining section 214 combines the outputs of the direction-selective filters 210, 211, 212, and 213. An example of the combining by the combining section 214 is shown in the form of an equation in Mathematical Expression 25.

[Mathematical Expression 25]

$$E_d(x,y) = E_h^2 + E_v^2 + E_{o1}^2 + E_{o2}^2$$

where $E_h$, $E_v$, $E_{o1}$, $E_{o2}$ are edge intensities in the horizontal, vertical, and ±45-degree directions.

The combining by the combining section 214 is not limited to the sum of squares type shown in Mathematical Expression 25, but the sum of absolute values or other types may be used.

The edge intensities in the high spatial frequency region, middle spatial frequency region, and low spatial frequency region, combined in each of the combining sections 214A, 214B, and 214C for the luminance component Y and color components R-Y and B-Y, are multiplied together and output. The edge intensities for Y, R-Y, and B-Y are then added together and fed to the edge line detecting section 7.

Here, the separation of the base image performed in the contour detecting section 203 is not limited to separating the image into the luminance component Y and color components R-Y and B-Y, but the base image may of course be separated into other components such as RGB components. Furthermore, it is not an essential requirement that the edge intensities for Y, R-Y, and B-Y be added together before being supplied to the edge line detecting section 207, but the edge intensities may be supplied to the edge line detecting section 207 after multiplication.

Figure 21:
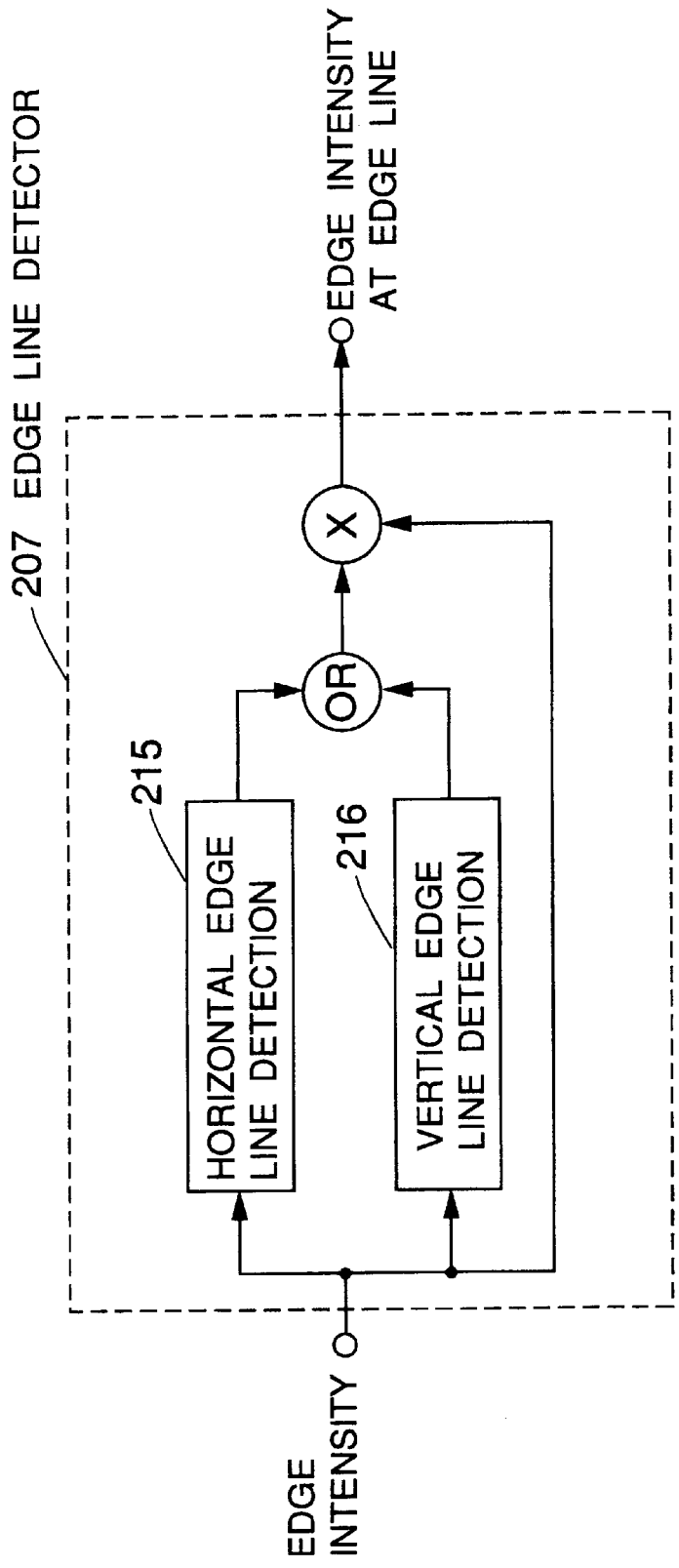
[FIG. 21] a diagram showing the configuration of an edge line detecting section according to the same embodiment.

Turning back to FIG. 18, of the edge intensities added together for Y, R-Y, and B-Y, the edge line detecting section 207 outputs the value only of the edge line. FIG. 21 shows one example of the configuration of the edge line detecting section 207. In FIG. 21, a horizontal edge line detection circuit 215 outputs a 1 when the edge intensity at the attention pixel is greater than both of the edge intensities at the pixels vertically adjacent to the attention pixel; otherwise, the circuit 215 outputs a 0.

Similarly, a vertical edge line detection circuit 216 outputs a 1 when the edge intensity at the attention pixel is greater than both of the edge intensities at the pixels horizontally adjacent to the attention pixel; otherwise, the circuit 216 outputs a 0. The outputs of the horizontal edge line detection circuit 215 and vertical edge line detection circuit 216 are ORed; the ORed result is then multiplied with the input signal, and the product is output. In this way, the edge line detecting section 207 outputs the edge intensity only of such a pixel that has an edge intensity greater than the edge intensities of the pixels adjacent horizontally or vertically to it (that is, a pixel forming part of an edge line). A 0 is output for other pixels.

Returning again to FIG. 18, the weight generating circuit 208 outputs a 1 when the reliability evaluation value for the initial parallax estimate is larger than or equal to a threshold value, and a 0 when it is smaller than the threshold value. By multiplying the output of the weight generating circuit 208 with the output of the edge line detecting section 207, an edge where the reliability of the initial parallax estimate is low, that is, the object's contour line where the parallax varies discontinuously, can be extracted. Further, the output of the weight generating circuit 208 is stored in a computation area memory in the parallax estimating section 204 for the estimation of parallax near the object's contour, which will be described later. The extraction of the object's contour line is shown in the form of an equation in Mathematical Expression 26.

[Mathematical Expression 26]

$$R(x,y) = W_e(x,y) E_d(x,y)$$

where $W_e$ is the weighting coefficient which is 1 where the reliability of the initial parallax estimation is low, and 0 where the reliability is high.

Here, it is not an essential requirement that the outputs of the edge detection circuits 206A, 206B, and 206C be added together before being supplied to the edge line detecting section 207, but their outputs may be multiplied together before inputting to the edge line detecting section 207. Further, the weights generated by the weight generating circuit 208 and multiplied with the output of the edge line detecting section 207 are not limited to the two values 0 and 1, but it may of course be configured to output consecutive values according to the reliability of the initial parallax estimation.

The parallax estimating section 204 for the estimation of parallax near the object's contour recomputes from the contour intensity and initial parallax the parallax at a region where the reliability of the initial parallax estimate is low. The parallax estimating section 204 for the estimation of parallax near the object's contour computes the parallax distribution that minimizes the energy in the parallax distribution, defined by Mathematical Expression 27.

[Mathematical Expression 27]

$$E(x, y, u, u_x, u_y) = \frac{1}{2} \int_A w(x, y) \left[ \left(\frac{\partial u}{\partial x}\right)^2 + \left(\frac{\partial u}{\partial y}\right)^2 \right] dx dy$$

where u is the parallax distribution, w(x,y) is a weighting function, and the integration region A is the region where the reliability evaluation value for the initial parallax estimation is larger than or equal to the threshold value.

The weighting function w(x,y) is defined as Mathematical Expression 28 by smoothness parameter and edge intensity.

[Mathematical Expression 28]

$$w(x, y) = \frac{1}{\lambda + R(x, y)}$$

where $\lambda$ is the parameter defining the smoothness of the parallax change, and R is the intensity of the contour line.

The condition of the parallax distribution that minimizes Mathematical Expression 27 is given by Mathematical Expression 29.

[Mathematical Expression 29]

$$\frac{\partial w}{\partial x}\frac{\partial u}{\partial x} + w\frac{\partial^2 u}{\partial x^2} + \frac{\partial w}{\partial y}\frac{\partial u}{\partial y} + w\frac{\partial^2 u}{\partial y^2} = 0$$

The differential equation of Mathematical Expression 29 can be solved numerically by using a known technique such as the finite element method (FEM).

Figure 22:
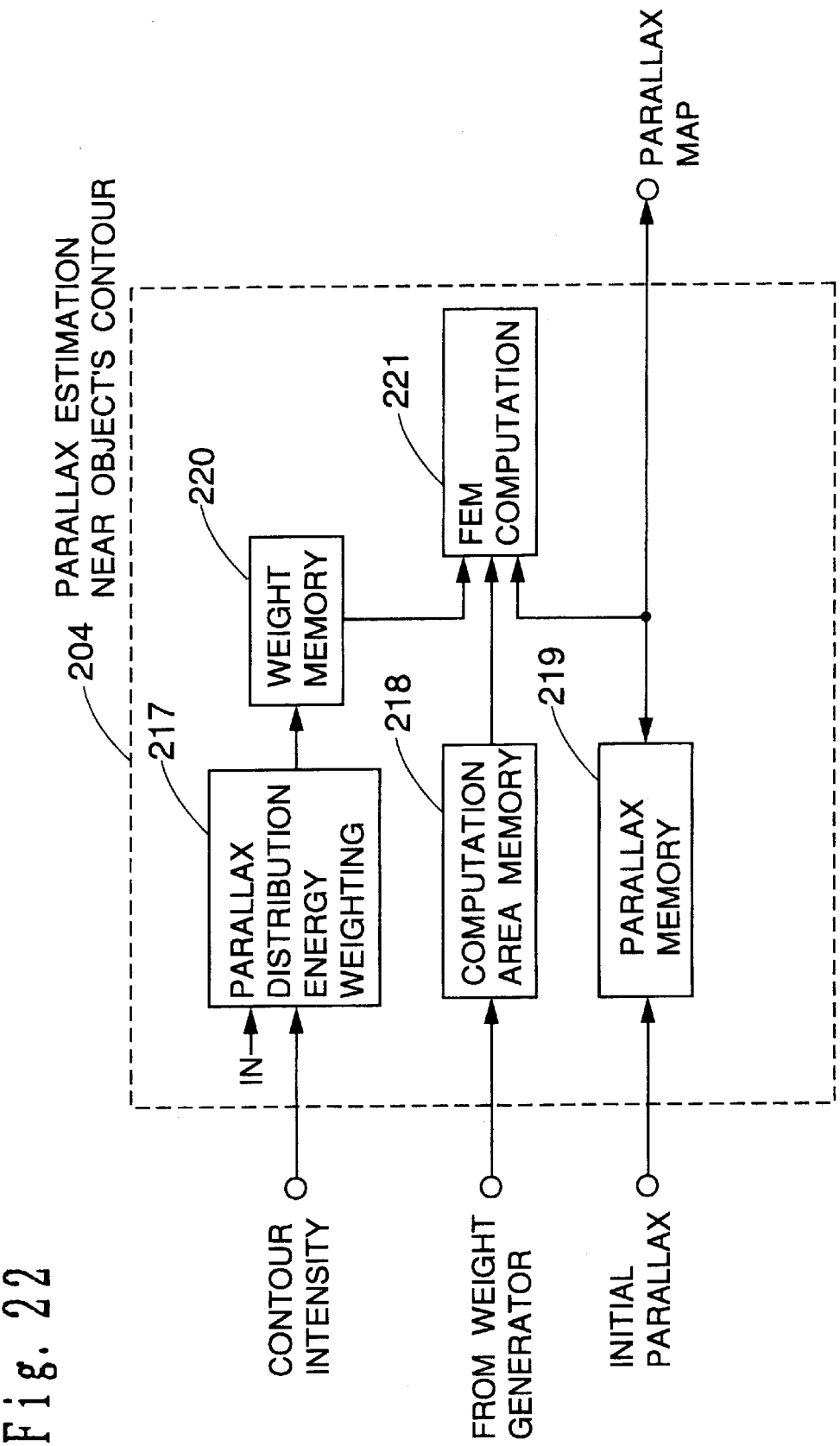
[FIG. 22] a diagram showing the configuration of a parallax estimating section for the estimation of parallax near an object's contour according to the same embodiment.

FIG. 22 is a block diagram showing one example of the configuration of the parallax estimating section 204 for the estimation of parallax near the object's contour. In FIG. 22, reference numeral 217 is a parallax distribution energy weighting circuit for generating a weight for parallax distribution energy, 218 is the computation area memory, 219 is a parallax memory, 220 is a weight memory, 221 is an FEM computation circuit.

The parallax distribution energy weighting circuit 217 calculates the value of the weighting function of Mathematical Expression 28 from the contour intensity and smoothness parameter A, and writes the value into the weight memory 220. The FEM computation circuit 221 solves Mathematical Expression 29 by the finite element method to calculate the parallax distribution.

As described above, according to the present embodiment, an object's contour line is detected in a region where the reliability of the parallax estimate by block matching is low, and in this way, the parallax estimation can be performed so that the parallax changes discontinuously across the detected object's contour line.

Furthermore, according to the present embodiment, the parallax estimation can be performed so that the parallax changes discontinuously across an object's contour line of an arbitrary shape.

The estimation of parallax near an object's contour is not limited to the calculation method of obtaining parallax-that minimizes the energy shown by Mathematical Expression 27. It is only required here that the parallax change across the object's contour line and connect smoothly with surrounding parallax. One such example will be described below.

(Embodiment 4)

Figure 23:
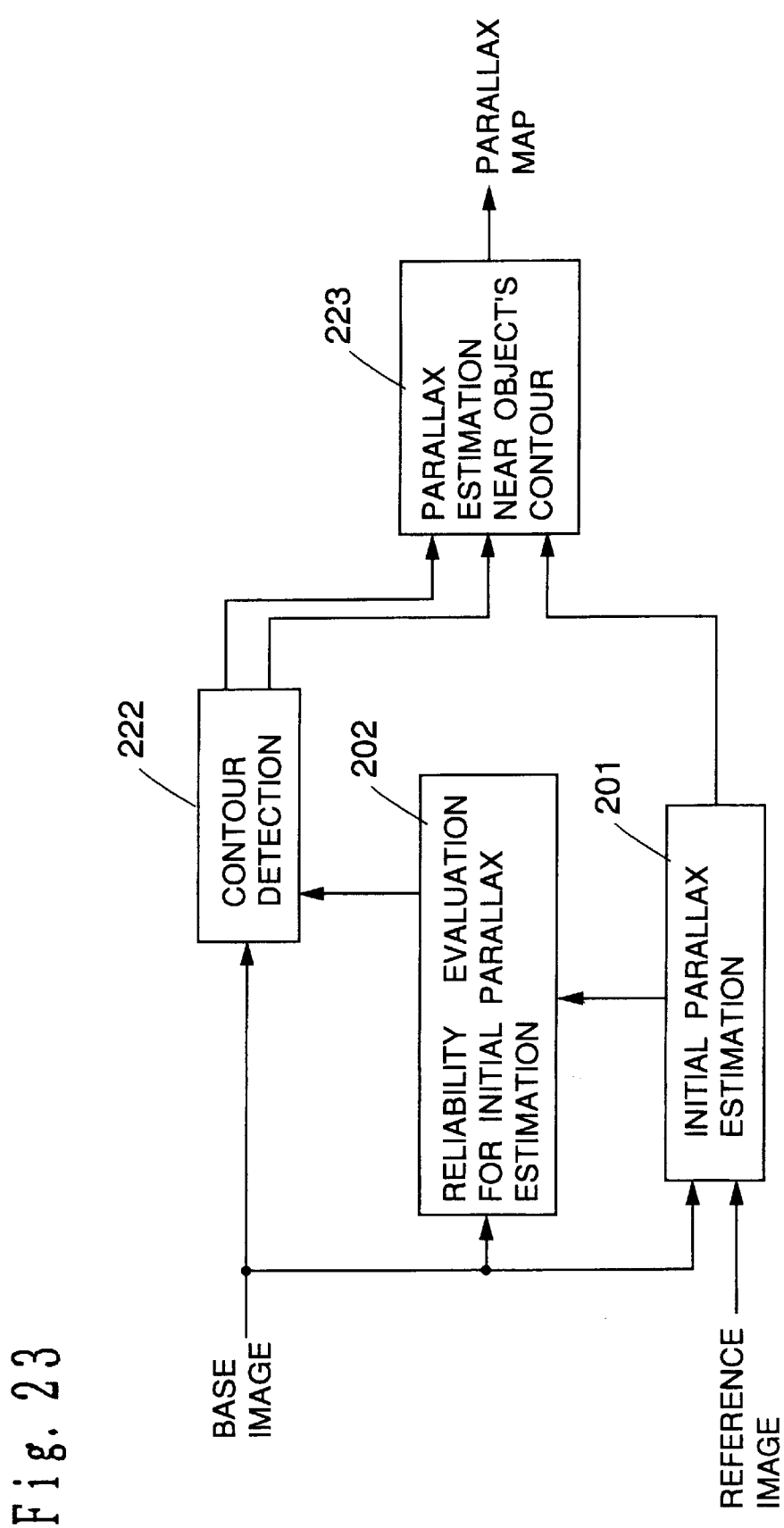
[FIG. 23] a diagram showing the configuration of a parallax estimation apparatus according to a fourth embodiment of the present invention.

FIG. 23 is a block diagram showing the configuration of a parallax estimation apparatus according to a fourth embodiment of the present invention. In FIG. 23, reference numeral 201 is an initial parallax estimating section for computing initial parallax by block matching, 202 is a reliability evaluating section for the initial parallax estimation, 222 is a contour detecting section, and 223 is a parallax estimating section for the estimation of parallax near an object's contour.

In the above configuration, the operation of component elements, other than the contour detecting section 222 and the parallax estimating section 223 for the estimation of parallax near an object's contour, is the same as that of the third embodiment of the present invention, and therefore, descriptions of such elements will not be repeated here. The operation of the contour detecting section 222 and the parallax estimating section 223 for the estimation of parallax near an object's contour will be described below.

First, the contour detecting section 222 performs contour detection similar to that performed by the contour detecting section in the third embodiment of the present invention, and outputs the result of the detection in binary form (for example, 0 and 1). The parallax estimating section 223 for the estimation of parallax near an object's contour computes, from the initial parallax and the object's contour line detected by the contour detecting section 222, the parallax at a region near the object's contour line where the reliability of the initial parallax estimate is low.

Figure 24:
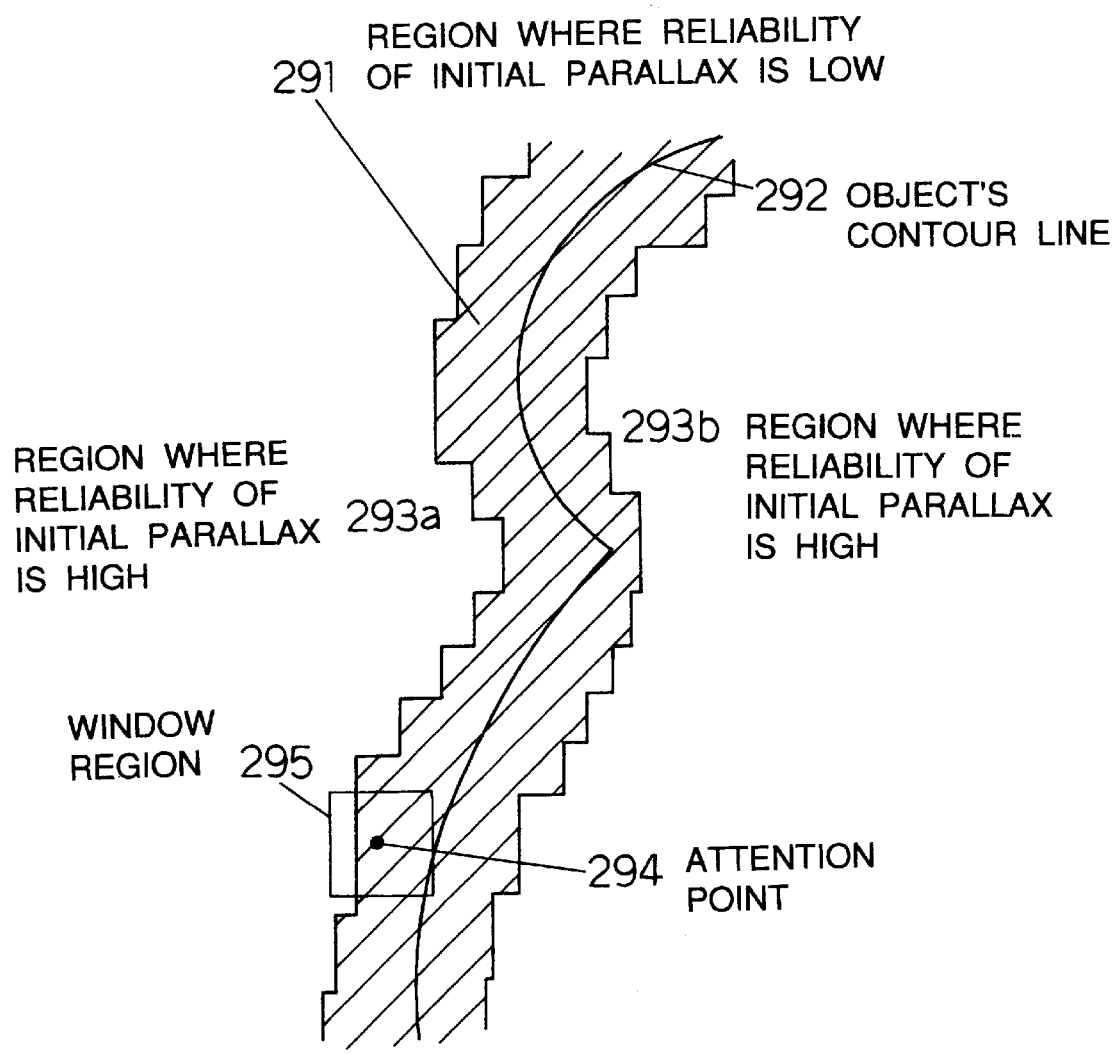
[FIG. 24] a diagram illustrating parallax estimation near an object's contour line.

FIG. 24 is a diagram showing how parallax near an object's contour is estimated by the parallax estimating section 223. In FIG. 24, reference numeral 291 is a region where the reliability of the initial parallax estimate is low, 292 is the contour line detected by the contour detecting section 222, 293 is a region where the reliability of the initial parallax estimate is high, 294 is an attention point at which the parallax is to be computed, and 295 is a window region that is so set as to contain the attention point.

Using the parallax at a surrounding region (in the illustrated example, the region 293a where the reliability of the initial parallax estimate is high) adjoining, within the window region, the region 291 where the reliability of the initial parallax estimate is low, the parallax at the attention point 294 (x, y) is determined so that the parallax at the attention point 294 is influenced by the value of the parallax at the adjoining region in accordance with the distance between the adjoining region and the attention point 294. At this time, by preventing the parallax at the adjoining region from influencing the attention point 294 across the object's contour line 292, the parallax can be determined in such a manner as to change across the object's contour line 292 and connect smoothly with the surrounding parallax. One example of the parallax estimation near the object's contour performed by the parallax estimating section 223 is shown in the form of an equation in Mathematical Expression 30.

[Mathematical Expression 30]

$$u(x, y) = \frac{\oint_C \frac{u(s, t)}{(s-x)^2 + (t-y)^2} dv}{\oint_C \frac{1}{(s-x)^2 + (t-y)^2} dv}$$

where the integration interval C is the outer periphery of the region where the reliability of the initial parallax estimation is high and which contacts the low-reliability region on the same side of the object's contour line as the attention point (x,y), v is a line element of the outer periphery, and (s,t) are the coordinates of the line element.

However, the parallax estimation near the object's contour performed by the parallax estimating section 223 need not necessarily be limited to Mathematical Expression 30, but it is only required here that the parallax change across the object's contour line and connect smoothly with surrounding parallax.

As described above, according to the present embodiment, an object's contour line is detected in a region where the reliability of the parallax estimate by block matching is low, and in this way, the parallax estimation can be performed so that the parallax changes discontinuously across the detected object's contour line.

Furthermore, according to the present embodiment, the parallax estimation can be performed so that the parallax changes discontinuously across an object's contour line of an arbitrary shape.

Moreover, according to the present embodiment, in a region where the reliability of the initial parallax estimate is low, the parallax is computed near an attention point by referring to a relatively small number of surrounding parallaxes; this has the effect of reducing the memory capacity and the amount of computation for the parallax computation.

By using the results of the parallax estimation described in the third and fourth embodiments and thereby shifting and combining the left and right images, it is possible to generate an image at a viewpoint intermediate between the viewpoints corresponding to the left and right images. Here, the parallax estimation and the generation of an intermediate-viewpoint image may be performed at different places. The following describes transmission and reception methods when the parallax estimation and the intermediate-viewpoint image generation are performed at different places.

(Embodiment 5)

Figure 25:
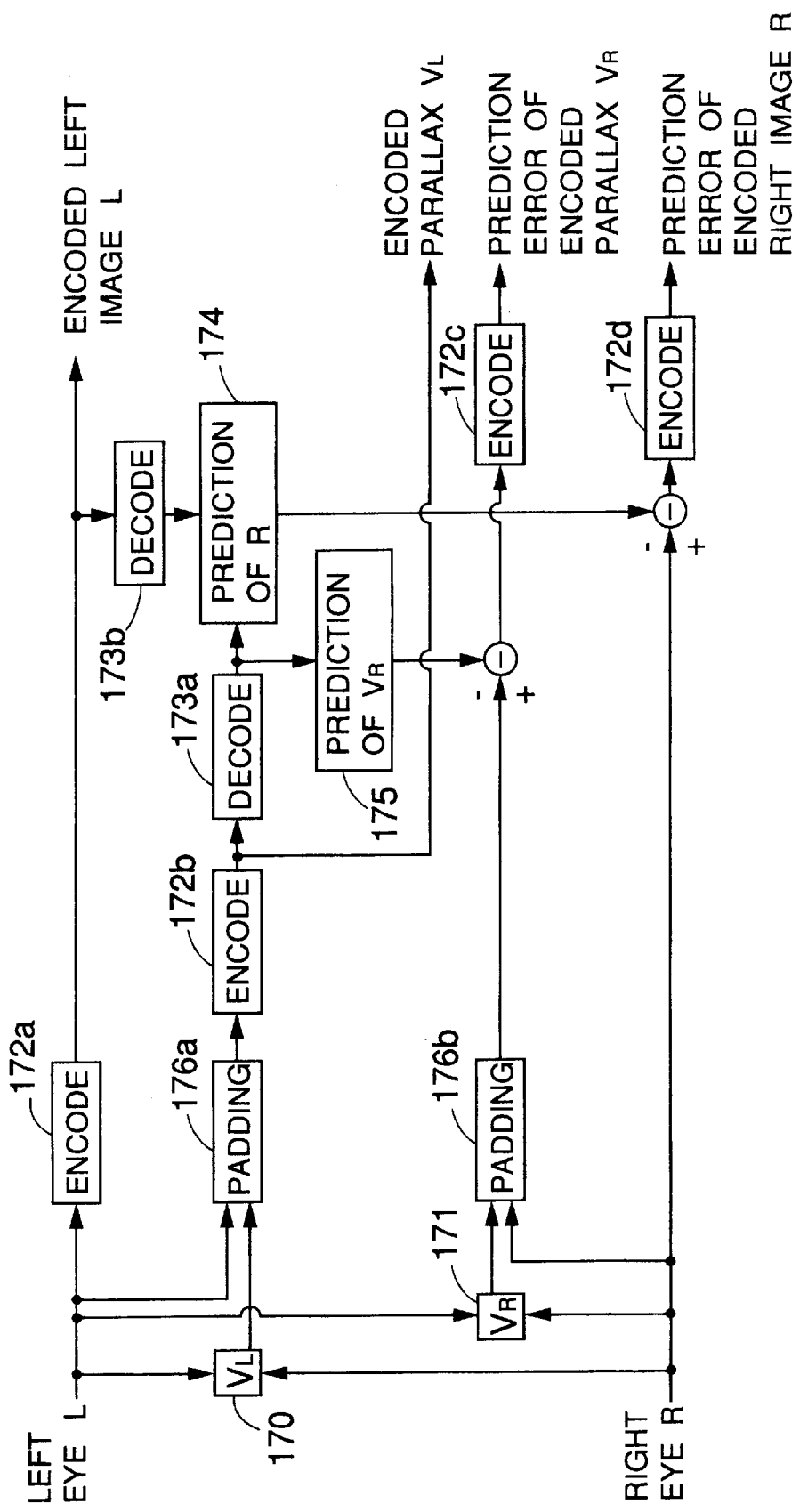
[FIG. 25] a diagram showing the configuration of a transmitting section of a system wherein parallax estimation is performed at the transmitting side according to a fifth embodiment of the present invention.

FIG. 25 is a diagram showing one example of a transmitting block of a system wherein parallax estimation (or motion estimation) is performed at the transmitting side, according to a fifth embodiment of the present invention. In FIG. 25, reference numeral 170 is a parallax estimating means for estimating parallax VL relative to the left image, 171 is a parallax estimating means for estimating parallax VR relative to the right image, 172a to 172d are encoders, 173a and 173b are decoders, 174 is a predicting means for predicting the right image R from the left-image L and from the parallax VL relative to the left image, 175 is a predicting means for predicting the parallax VR relative to the right image from the parallax VL relative to the left image, and 176a and 176b are padding means for determining parallax at regions where parallax cannot be estimated correctly. The operation of the above configuration will be described below.

First, the left image L is encoded by the encoder 172a. The parallaxes VL and VR relative to the left and right images are estimated by the parallax estimating means 170 and 171, respectively. For regions where parallax cannot be correctly estimated because of occlusion, etc., parallax is determined by the padding means 176a and 176b using the parallax estimation method described in the third or fourth embodiment.

Next, the parallax relative to the left image, after padding, is encoded by the encoder 172b. The parallax relative to the left image, after padding, and thus encoded, is decoded by the decoder 173a and is used by the predictor 174 for the prediction of the right image R and by the predictor 175 for the prediction of the parallax relative to the right image after padding. Using the parallax relative to the left image, the predictor 175 predicts the parallax VR relative to the right image by calculating Mathematical Expression 31.

[Mathematical Expression 31]

$$V_R(x+V_L(x,y),y) = -V_L(x,y)$$

The predicted image from the predictor 174 is subtracted from the right image R, and the residual is encoded by the encoder 172d. The predicted parallax from the predictor 175 is subtracted from the parallax VR relative to the right image after padding, and the residual is encoded by the encoder 172c.

Figure 26:
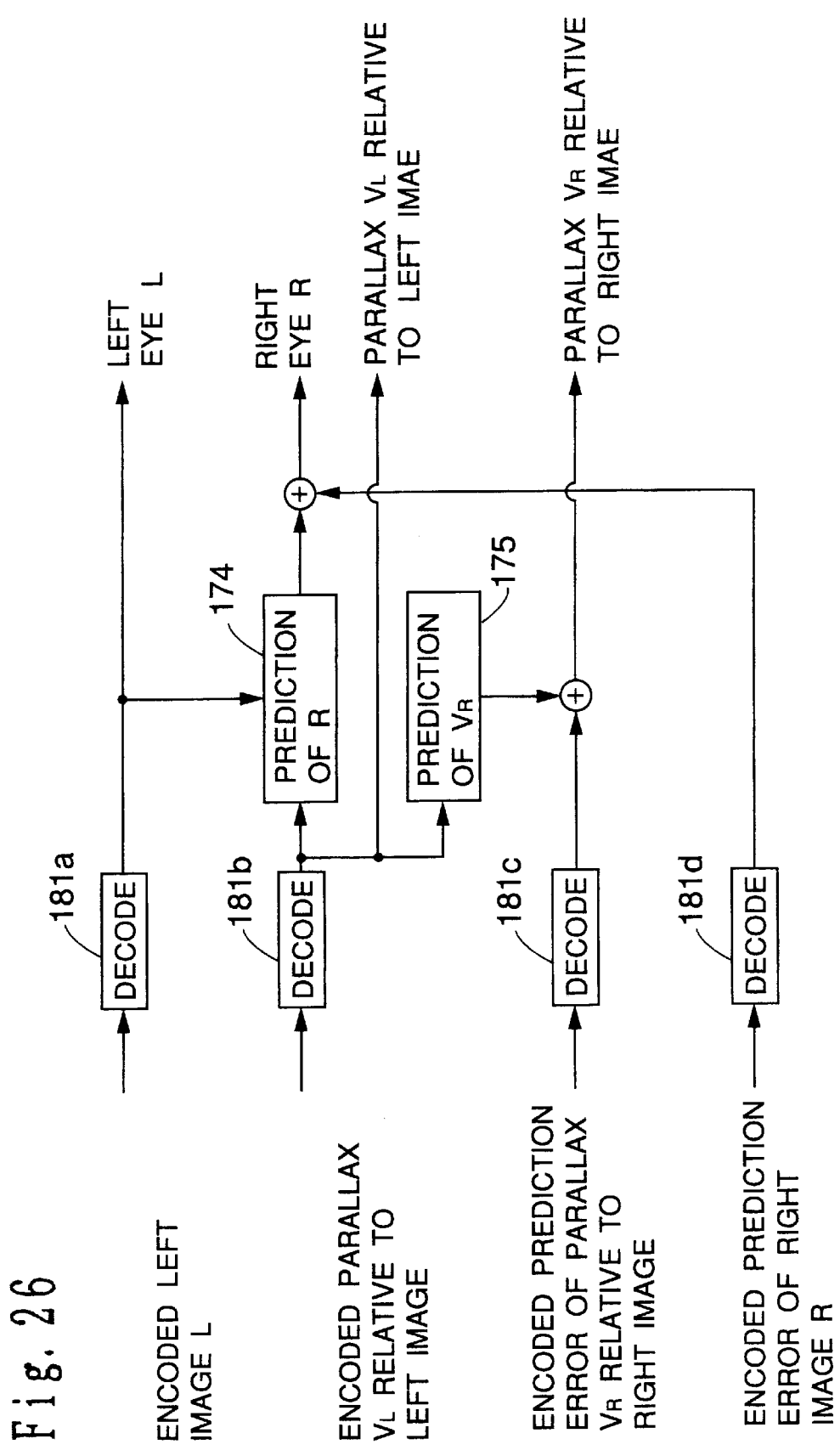
[FIG. 26] a diagram showing the configuration of a receiving section of the system wherein parallax estimation is performed at the transmitting side according to the fifth embodiment of the present invention.

FIG. 26 is a diagram showing one example of a receiving block of a system wherein the parallax estimation is performed at the transmitting side. In FIG. 26, 181a to 181d are decoders, 174 is a predictor for predicting the right image R, and 175 is a predictor for predicting the parallax relative to the right image. The encoded left image L, parallax VL relative to the left image, prediction error of the parallax VR relative to the right image, and prediction error of the right image R are respectively decoded by the decoders 181a to 181d. The right image R is recovered by adding the decoded prediction error of the right image to the result of the prediction by the predictor 174. The parallax VR relative to the right image is recovered by adding the decoded prediction error to the result of the prediction by the predictor 175.

Once the left image L, right image R, parallax VL relative to the left image, and parallax VR relative to the right image have been recovered, an image at a viewpoint intermediate between the left and right images can be generated using, for example, the intermediate image generation method described in Japanese Patent Unexamined Publication No. 7-109821, and be presented for display together with the left and right images as multi-viewpoint images.

As described above, with the above configuration, by performing the parallax estimation and padding at the transmitting side, the amount of computation at the receiving side can be reduced, permitting a reduction in the size of the receiving apparatus.

When transmitting multi-viewpoint images, if an intermediate image is generated at the transmitting side, an image transmission can be achieved with a reduced amount of transmission information. Such an example will be described below.

(Embodiment 6)

Figure 27:
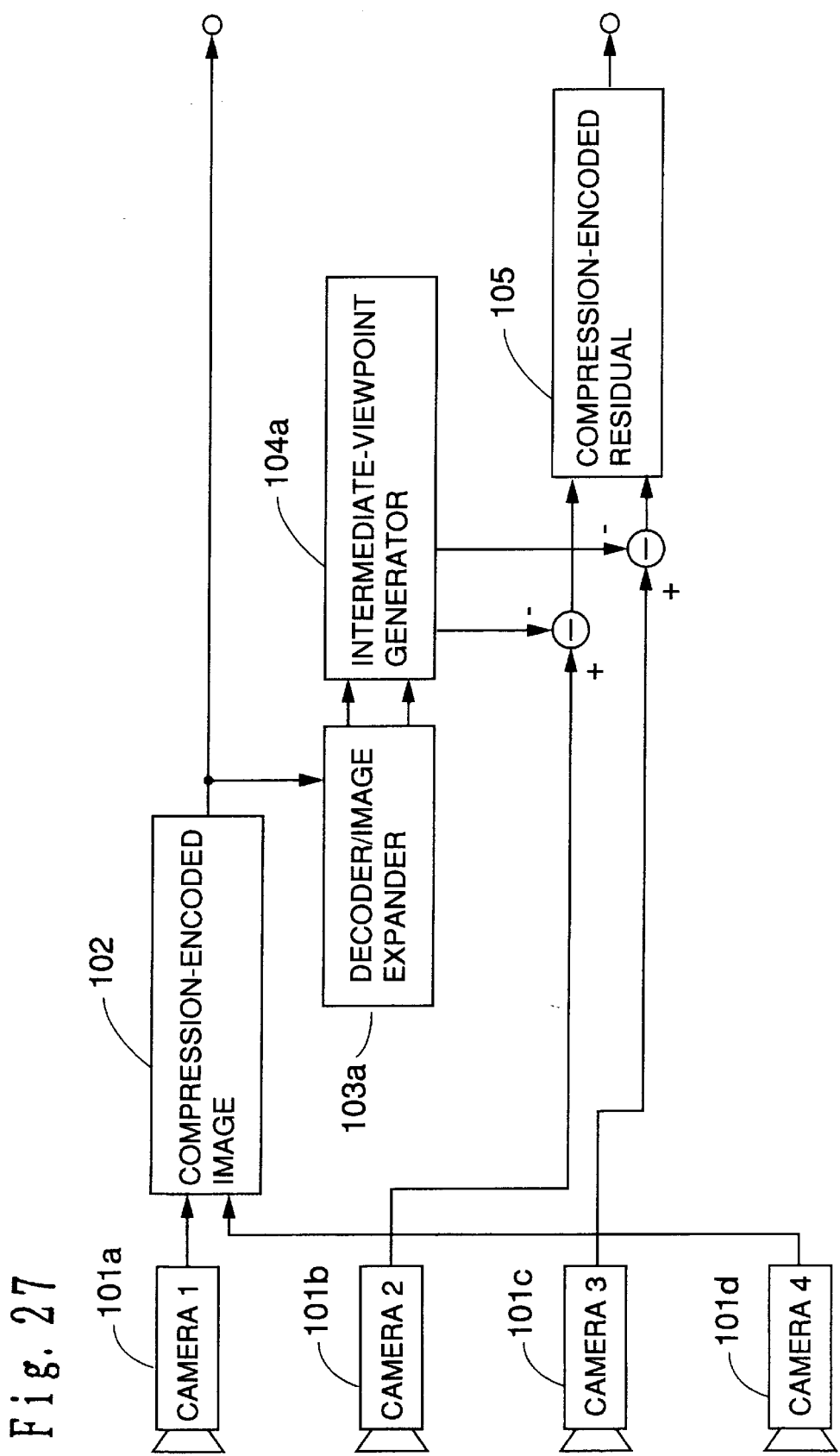
[FIG. 27] a diagram showing the configuration of a transmitting section of a multi-viewpoint image transmission system according to a sixth embodiment of the present invention.
Figure 28:
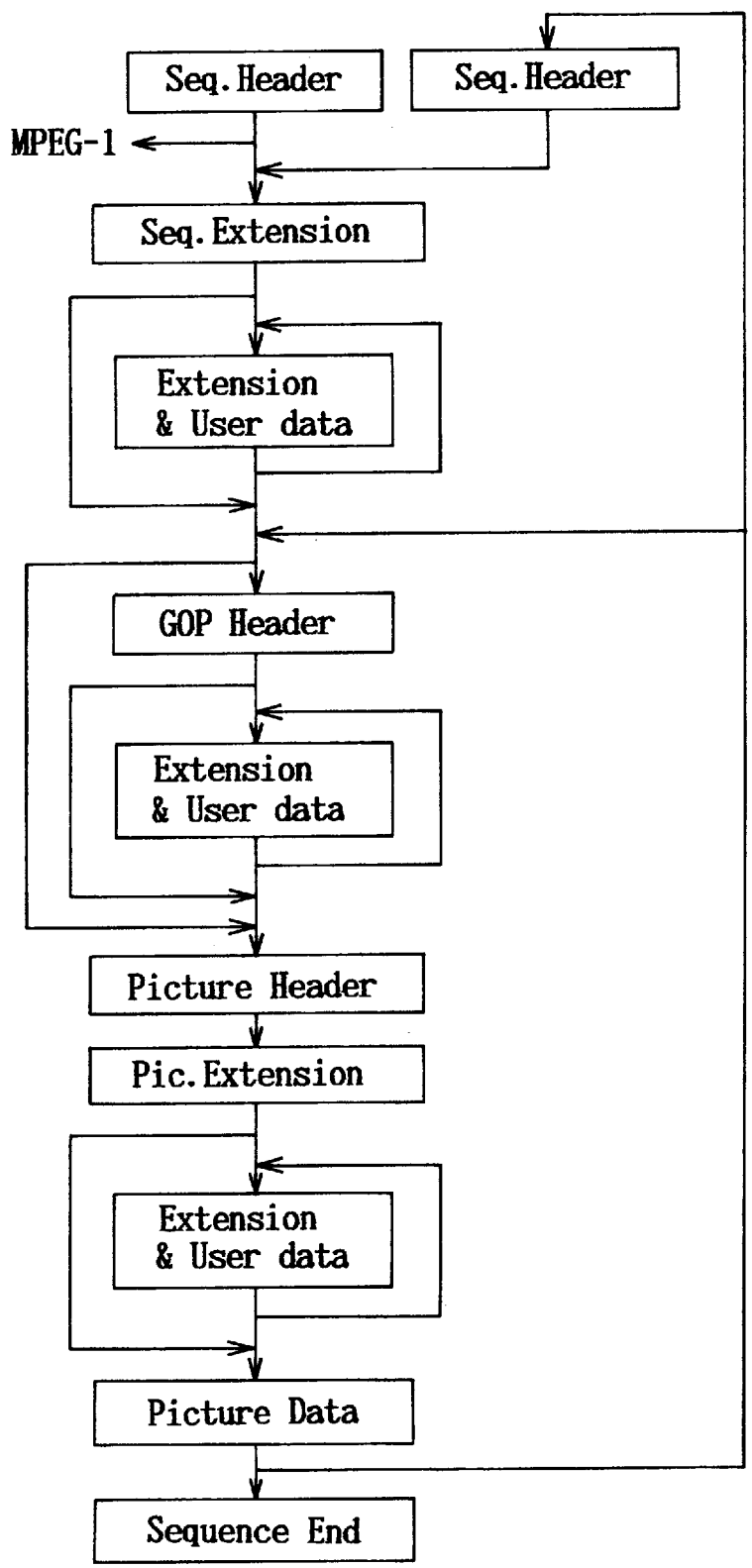
[FIG. 28] a diagram showing an outline of the MPEG-2 syntax.
Figure 29:
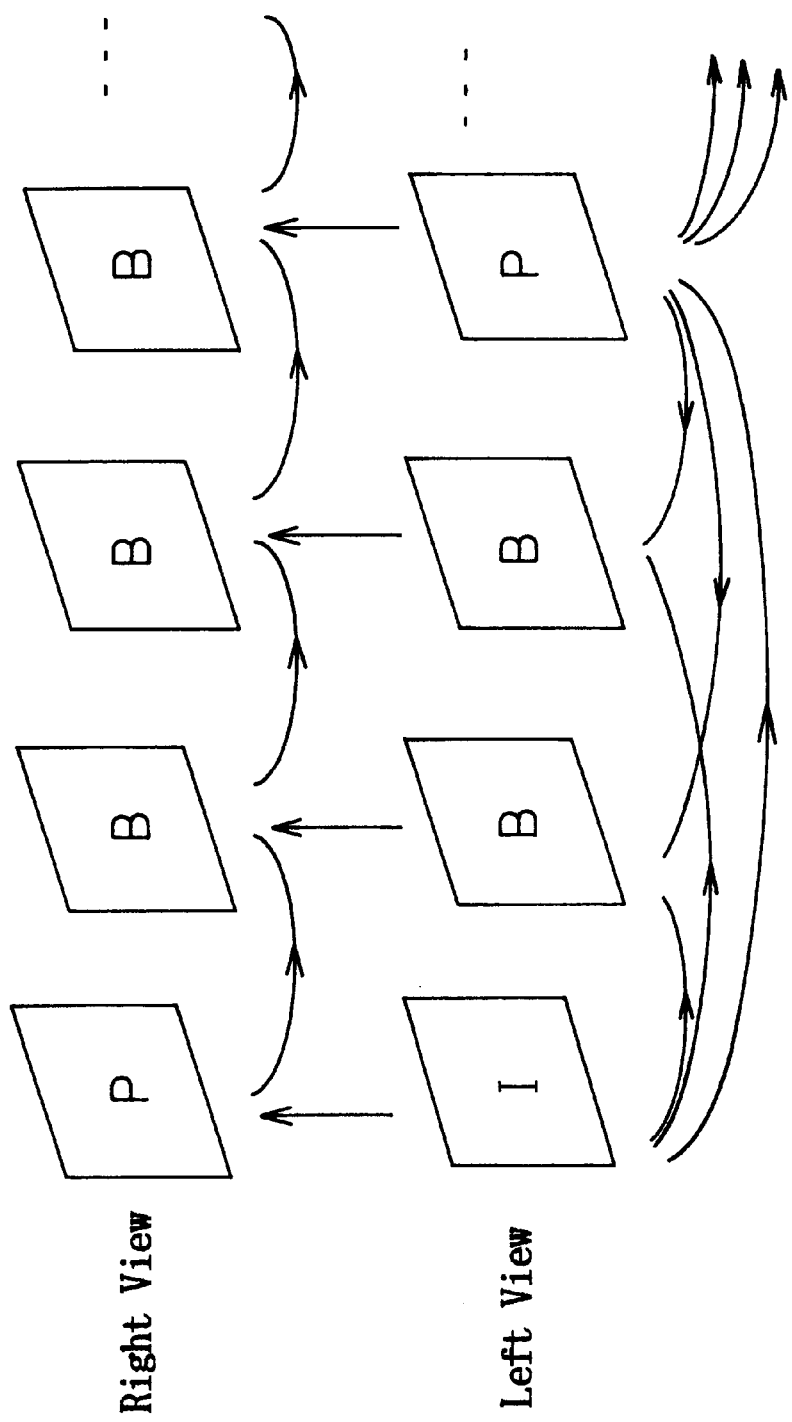
[FIG. 29] a diagram showing temporal and spatial relationships of multi-viewpoint images to be transmitted.
Figure 30:
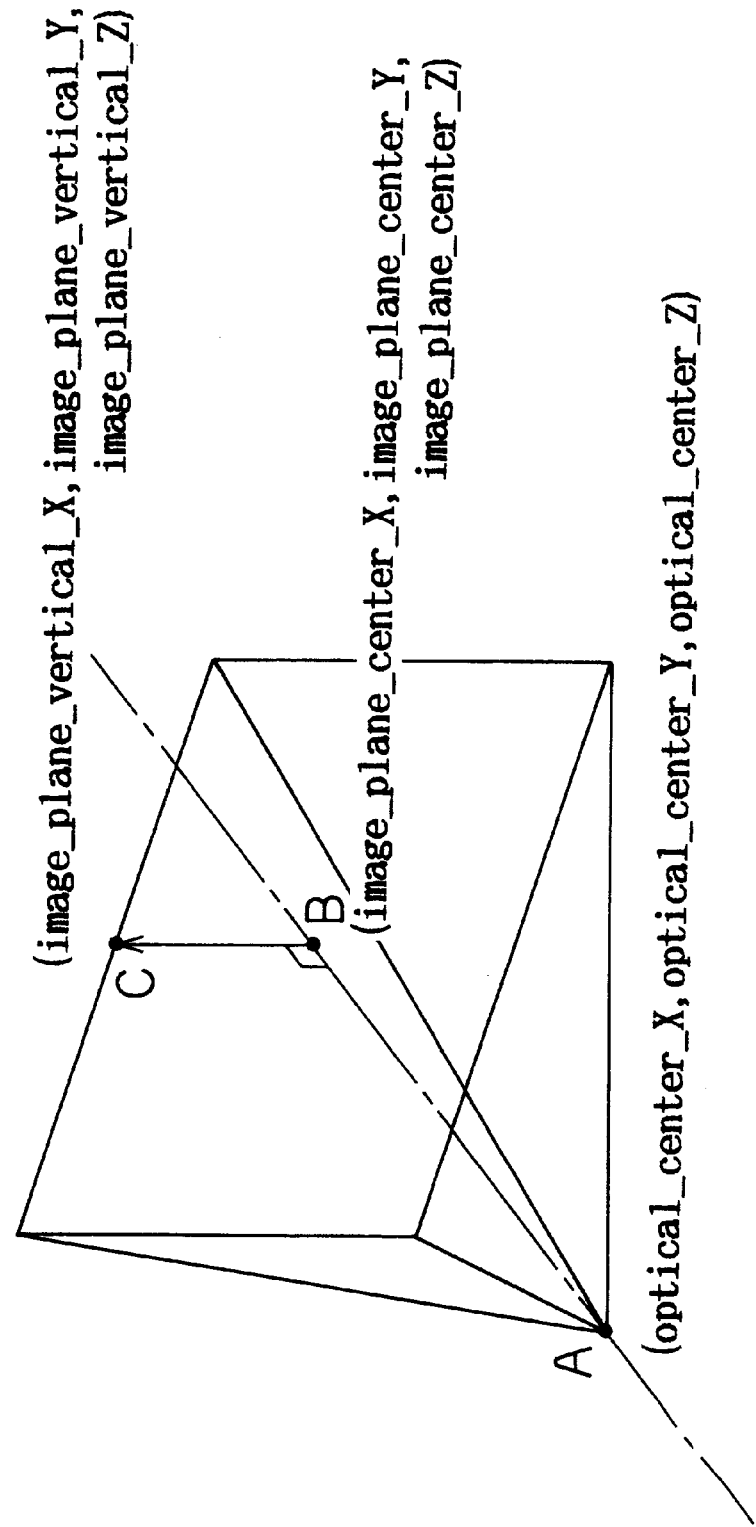
[FIG. 30] a diagram showing the definitions of camera parameters according to OpenGL.

FIG. 27 is a diagram showing the configuration of a transmitting section of a multi-viewpoint image compression and transmission system according to a sixth embodiment of the present invention. In FIG. 27, reference numerals 101a to 101d are cameras for capturing images at different viewpoint positions, 102 is an image compression encoder for compressing and encoding the images from the camera 1 and camera 4, 103a is a decoder/image expander for decoding and expanding the image data compression-encoded by the image compression encoder 102, 104a is an intermediate-viewpoint image generator for predicting and generating images with the viewpoints of the camera 2 and camera 3 from the images captured by the camera 1 and camera 4 and decoded and expanded by the decoder/image expander 103a, and 105 is a residual compression encoder for compressing and encoding residuals between the images of the camera 2 and camera 3 and the images generated by the intermediate-viewpoint image generator 104a.

Figure 31:
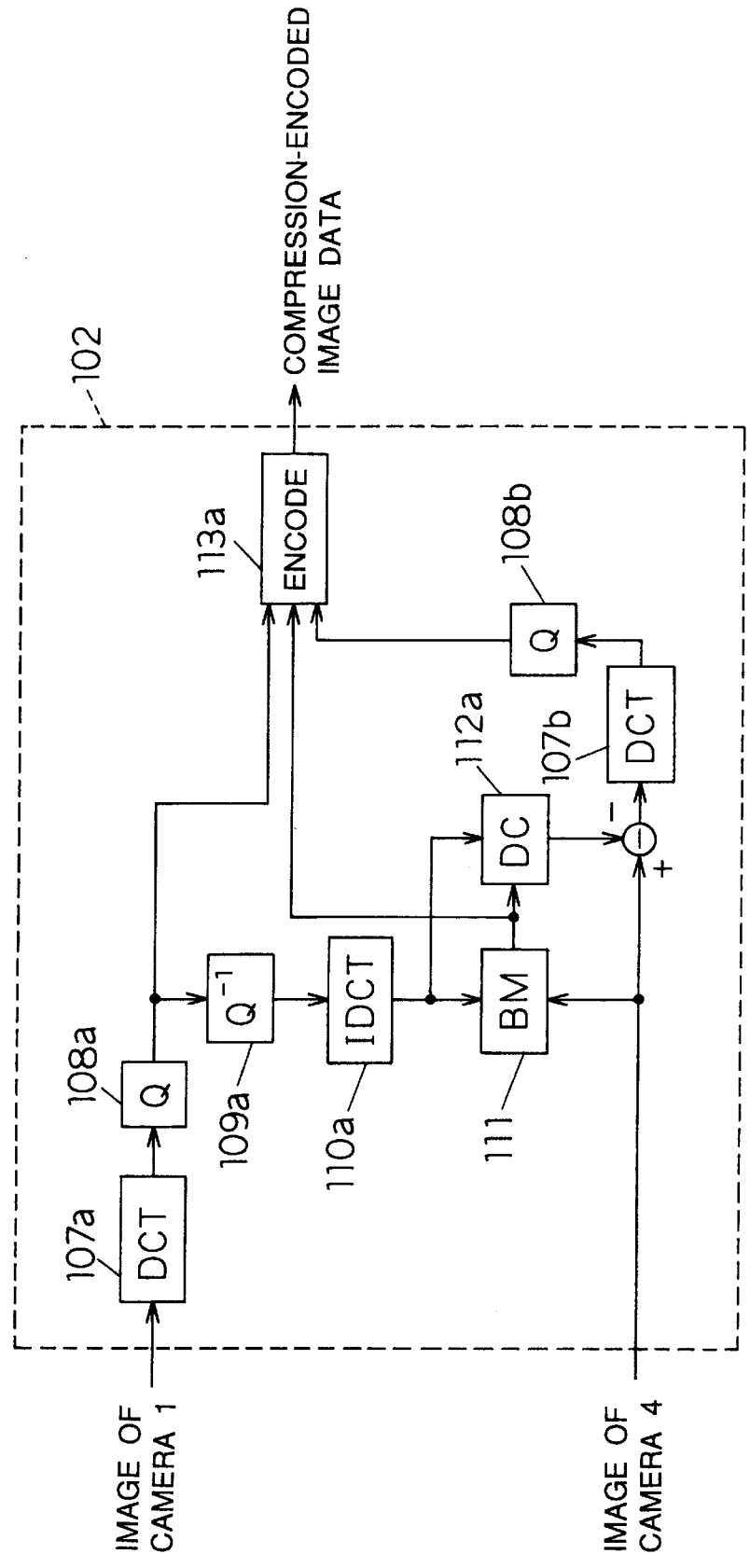
[FIG. 31] a diagram showing one example of the configuration of an image compression encoder in the multi-viewpoint image transmission system according to the sixth embodiment of the present invention.

The image compression encoder 102 compresses and encodes a plurality of images (in the present embodiment, of the images of four different viewpoints, the images with viewpoints at both ends), selected from among multi-viewpoint images, by using an existing technique utilizing, for example, block correlation between images. FIG. 31 shows one example of the configuration of the image compression encoder 102. In FIG. 31, reference numerals 107a and 107b are DCT means for computing DCT coefficients by performing a DCT computation on each block of 8×8 or 16×16 pixels, 108a and 108b are quantizing means for quantizing the DCT coefficients, 109a is an inverse quantizing means, 110a is an inverse DCT means for performing an inverse DCT computation, 111 is a parallax detecting means, 112a is a parallax compensating means, and 113a is an encoding means for encoding the quantized DCT coefficients and the parallax. The operation of this configuration will be described below.

The DCT means 107a processes the image from the camera 1 on a block-by-block basis to compute the DCT coefficients for each block. The quantizing means 108a quantizes the DCT coefficients. The inverse quantizing means 109a inverse-quantizes the quantized DCT coefficients. The inverse DCT means 110a inverse-transforms the inverse-quantized DCT coefficients to reconstruct the image captured by the camera 1 and supposed to be recovered at the receiving side. The parallax detecting means 111 performs block matching between the reconstructed image of the camera 1 and the image from the camera 4, and computes the parallax relative to the image of camera 1 on a block-by-block basis. The parallax compensating means 112a predicts the image of the camera 4 by using the reconstructed image of the camera 1 and the block-by-block parallax (this processing corresponds to motion compensation of moving images). The DCT means 107b processes the residual between the image of the camera 4 and the predicted image on a block-by-block basis, to compute the DCT coefficients for each block. The quantizing means 108b quantizes the DCT coefficients of the residual. The encoding means 113a encodes the quantized DCT coefficients of the image of the camera 1, the block-by-block parallax, and the quantized DCT coefficients of the parallax compensated residual.

Figure 32:
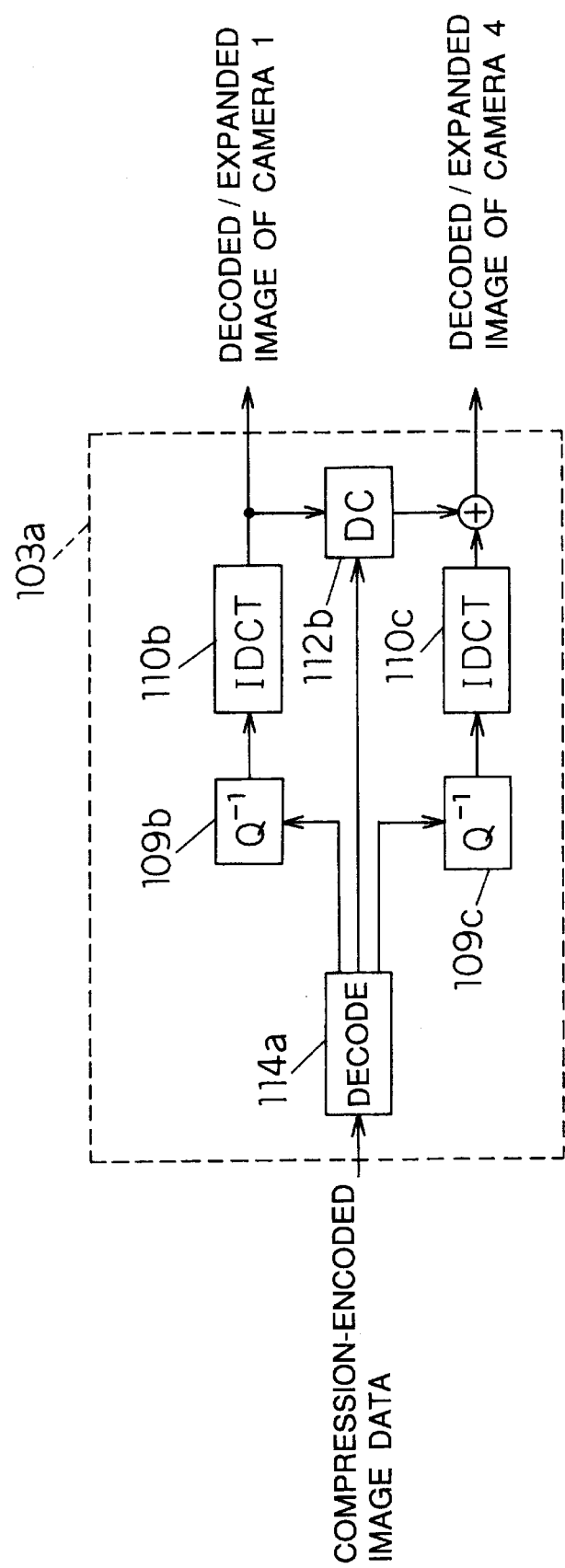
[FIG. 32] a diagram showing one example of the configuration of a decoder/image expander in the multi-viewpoint image transmission system according to the sixth embodiment of the present invention.

The decoder/image expander 103a decodes and expands the image data compression-encoded by the image compression encoder 102. FIG. 32 is a diagram showing one example of the configuration of the decoder/image expander 103a. In FIG. 32, 114a is a decoding means, 109b and 109c are inverse quantizing means, 110b and 110c are inverse DCT means, and 112b is a parallax compensating means. The operation of this configuration will be described below.

The decoding means 114a decodes the compression-encoded data for expansion into the quantized DCT coefficients of the image of the camera 1, the block-by-block parallax, and the quantized DCT coefficients of the parallax compensated residual. The quantized DCT coefficients of the image of the camera 1 are inverse-quantized by the inverse quantizing means 109b, and expanded by the inverse DCT means 110b to reconstruct the image. The parallax compensating means 112b generates the predicted image of the camera 4 from the reconstructed image of the camera 1 and the decoded parallax. Then, the residual-expanded by the inverse quantizing means 109c and inverse DCT means 110c is added to the predicted image to expand the image of the camera 4.

The intermediate-viewpoint image generator 104a computes parallax pixel by pixel from the images of the camera 1 and camera 4 by using the method shown in the third or fourth embodiment of the present invention, and predicts and generates the images of the camera 2 and camera 3.

Figure 33:
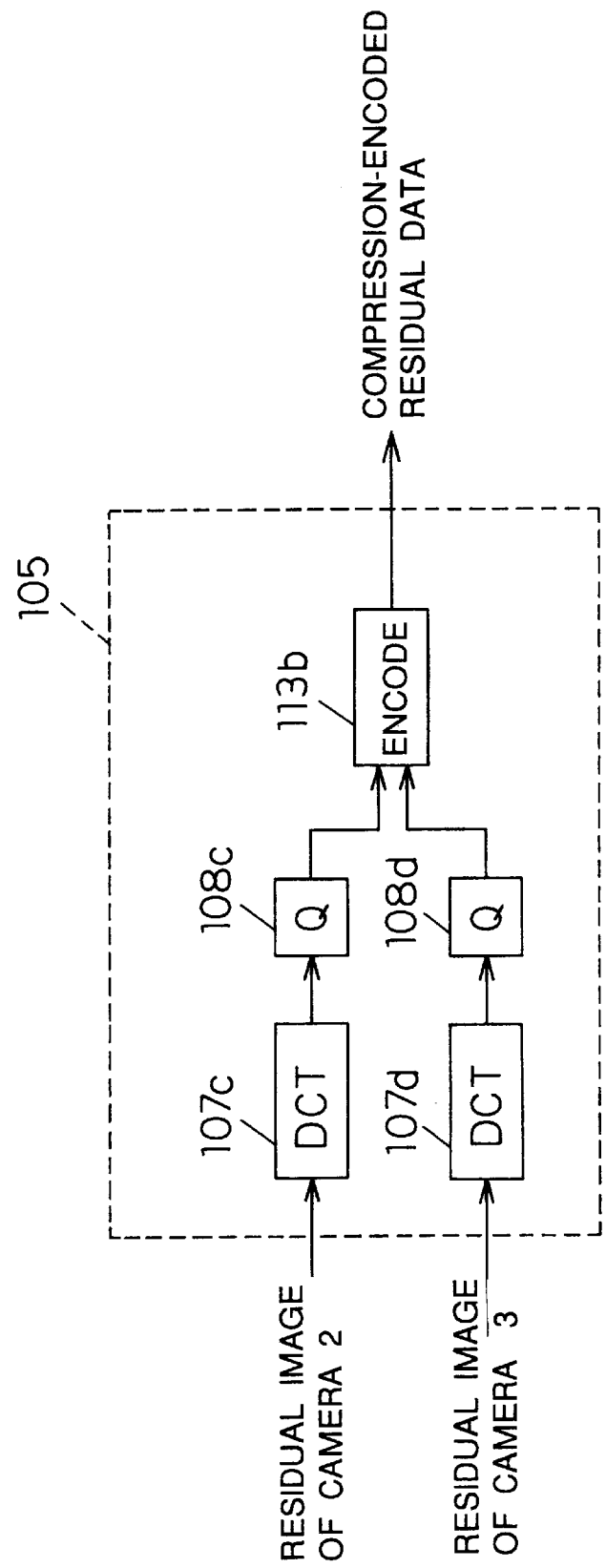
[FIG. 33] a diagram showing one example of the configuration of a residual compression encoder in the multi-viewpoint image transmission system according to the sixth embodiment of the present invention.

The residual compression encoder 105 compresses and encodes the residuals between the images of the camera 2 and camera 3 and their predicted images. Since the intermediate-viewpoint image generator 104a computes the parallax on a pixel-by-pixel basis, the parallax can be computed with high accuracy compared to the block-by-block parallax computation by block matching. This serves to reduce the prediction errors (residuals) of the intermediate-viewpoint images and enhance the compression efficiency, and thus achieves more effective bit allocation and compression while maintaining image quality. FIG. 33 shows one example of the configuration of the residual compression encoder. In FIG. 33, reference numerals 107c and 107d are DCT means, 108c and 108d are quantizing means, and 113b is an encoding means. The residual images of the camera 2 and camera 3 are transformed by the respective DCT means 107c and 107d into DCT coefficients, which are quantized by the quantizing means 108c and 108d and encoded by the encoding means 113b.

Figure 34:
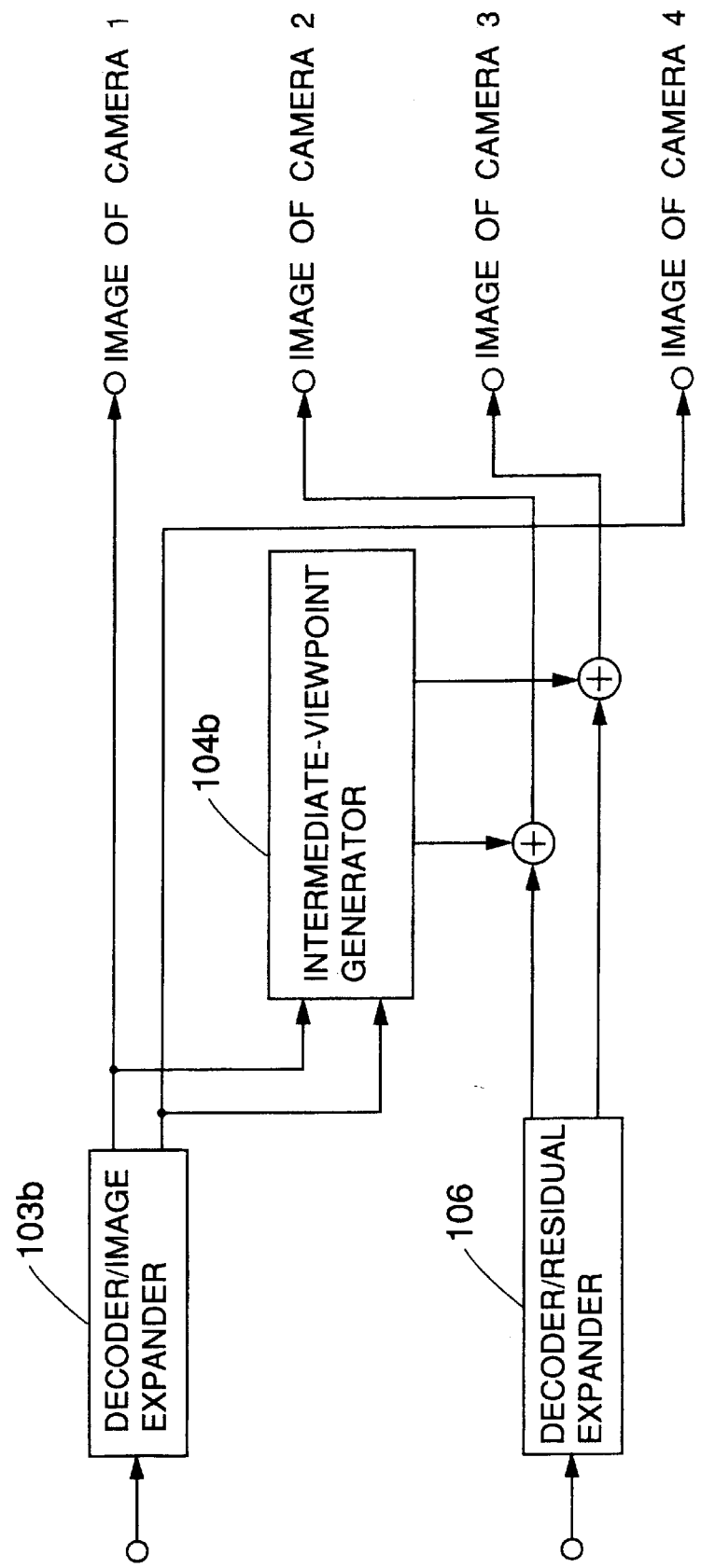
[FIG. 34] a diagram showing the configuration of a receiving section of the multi-viewpoint image transmission system according to the sixth embodiment of the present invention.

FIG. 34 is a diagram showing the configuration of a receiving section of the multi-viewpoint image compression and transmission system according to the sixth embodiment of the present invention. In FIG. 34, reference numeral 103b is a decoder/image expander for decoding and expanding the image data of the camera 1 and camera 4 compression-encoded by the image compression encoder 102 at the transmitting side, 104b is an intermediate-viewpoint image generator for predicting and generating the images with the viewpoints of the camera 2 and camera 3 from the images of the camera 1 and camera 4 decoded and expanded by the decoder/image expander 103b, and 106 is a decoder/residual expander for decoding and expanding the prediction errors (residuals) of the predicted images with the viewpoints of the camera 2 and camera 3. The operation of the decoder/image expander 103b and intermediate-viewpoint image generator 104b is the same as the operation of the decoder/image expander 103a and intermediate-viewpoint image generator 104a at the transmitting side, and therefore, their descriptions will not be repeated here. The operation of the decoder/residual expander will be described below.

Figure 35:
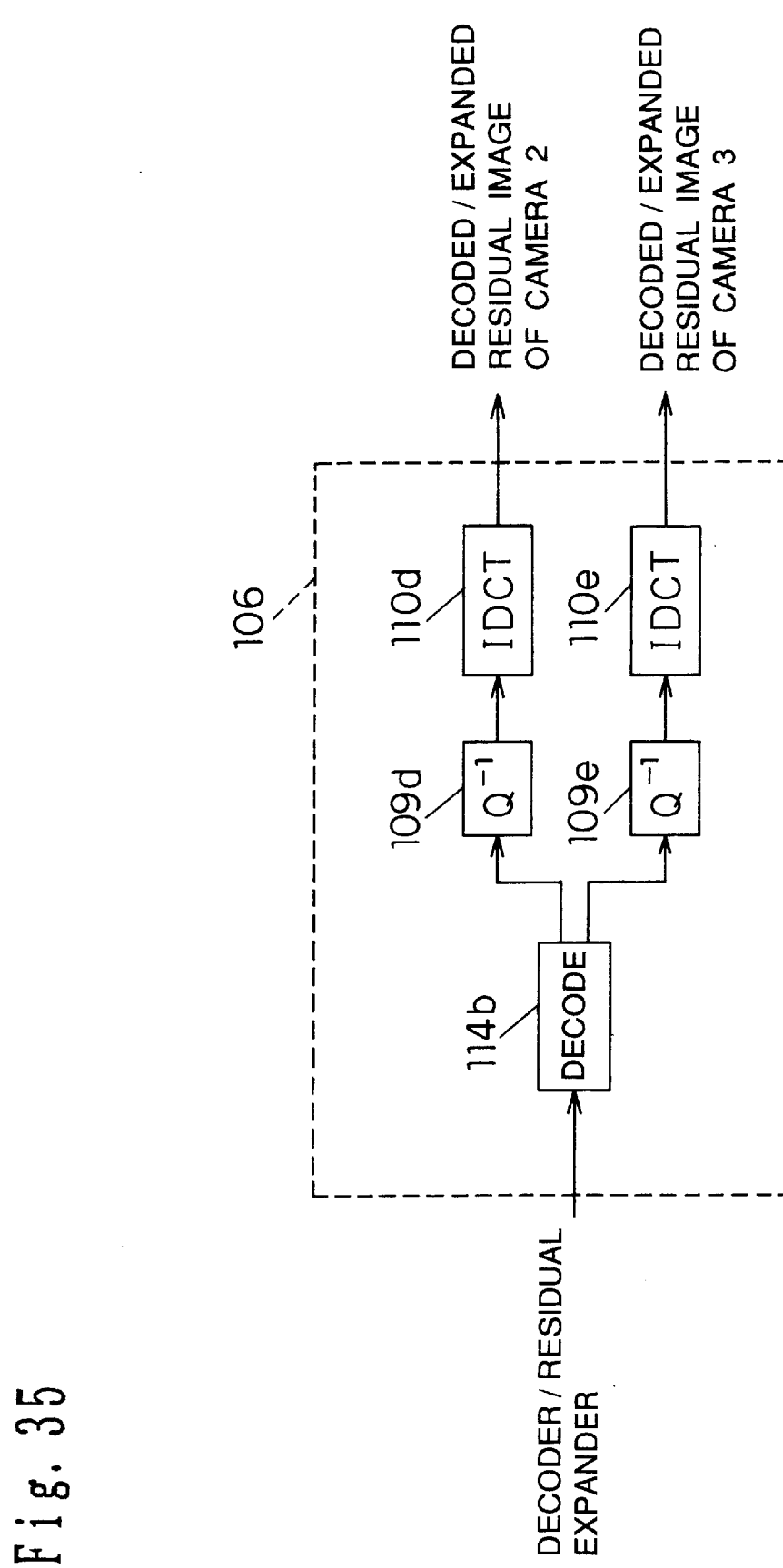
[FIG. 35] a diagram showing one example of the configuration of a decoder/residual expander in the multi-viewpoint image transmission system according to the sixth embodiment of the present invention.

The decoder/residual expander 106 decodes and expands the prediction errors (residuals) of the predicted images with the viewpoints of the camera 2 and camera 3, which errors were compression-encoded by the residual compression encoder 105 at the transmitting side. FIG. 35 shows one example of the configuration of the decoder/residual expander 106. In FIG. 35, reference numeral 114b is a decoding means, 109d and 109e are inverse quantizing means, and 110d and 110e are inverse DCT means. The compression-encoded residual image data of the camera 2 and camera 3 are decoded by the decoding means 114b, and then inverse-quantized by the inverse quantizing means 109d and 109e and expanded by the inverse DCT means 110d and 110e. The thus decoded and expanded residual images of the camera 2 and camera 3 are superimposed on the respective images generated by the intermediate-viewpoint image generator 104b, thereby reconstructing the images with the viewpoints of the camera 2 and camera 3.

As described above, according to the present embodiment, at the transmitting side, images with viewpoints intermediate between two nonadjacent images selected from among multi-viewpoint images are generated from the nonadjacent two images, residuals are obtained between the intermediate-viewpoint images thus generated and the actual images with the same intermediate viewpoints, and the two nonadjacent images and the residuals of the intermediate-viewpoint images are compression-encoded and transmitted. At the receiving side, the transmitted two images and residuals of the intermediate-viewpoint images are decoded and expanded, images with the intermediate viewpoints are generated from the two images, and the decoded and expanded residuals of the intermediate-viewpoint images are superimposed on the generated images, thereby reconstructing the images corresponding to the actual images with the same intermediate viewpoints. In this way, multi-viewpoint images can be compressed and transmitted efficiently while maintaining image quality.

The configuration for intermediate-viewpoint image generation need not be limited to generating images with intermediate viewpoints from the images with the viewpoints at both ends (the viewpoints of the camera 1 and camera 4) among the multi-viewpoint images; rather, it may be configured, for example, to generate images with the viewpoints of the camera 1 and camera 3 from the images of the camera 2 and camera 4 or to generate images with the viewpoints of the camera 2 and camera 4 from the images of the camera 1 and camera 3. It is also possible to generate images with the viewpoints of the camera 1 and camera 4 from the images of the camera 2 and camera 3. Any of these alternative arrangements will fall within the scope of the present invention.

The number of viewpoints for the multi-viewpoint images need not be limited to four; rather, it is clear that from images with two or more viewpoints, images with viewpoints intermediate between them may be generated. This also falls within the scope of the present invention.

In the third and fourth embodiments of the invention, the reliability evaluation value for the initial parallax estimate need not be limited to the one shown in Mathematical Expression 23, but only the numerator of Mathematical Expression 23 may be used as the reliability evaluation value. In that case also, approximately the same effect can be obtained though the value is influenced by the luminance gradient of the reference image. This variation also is embraced in the present invention.

Furthermore, when the image noise level is low, it is obvious that the same effect can be obtained if the reliability evaluation value is calculated by ignoring the noise term. This also falls within the scope of the present invention.

To further simplify, the minimum value of the sum of squares of differences per pixel, or the minimum value of the sum of squares of differences, may be used as the reliability evaluation value. This serves to simplify the computation circuitry and falls within the scope of the present invention.

Furthermore, for the reliability evaluation value for the initial parallax estimate, it is also possible to use the difference between parallaxes estimated in both directions, as shown in Mathematical Expression 32. This also falls within the scope of the present invention.

[Mathematical Expression 32]

$$J = (u_{base}(x,y) + u_{ref}(x + u_{base}(x,y), y))^2$$

where $u_{base}$ is the parallax of the reference image relative to the base image, and $u_{ref}$ is the parallax of the base image relative to the reference image.

Moreover, two or more of the above methods may be combined to calculate the reliability evaluation value for the initial parallax estimate. This increases the stability of reliability evaluation and falls within the scope of the present invention.

In the third and fourth embodiments of the invention, correlation computation between the images for the estimation of initial parallax need not be limited to the sum of squares of differences (SSD), but it will be appreciated that the same effect can be obtained if the sum of absolute values of differences (SAD) is used. Such an embodiment is, of course, embraced in the present invention.

In the sixth embodiment of the invention, the method of compression-encoding the images with two nonadjacent viewpoints need not be limited to a technique using correlation between images (viewpoints), but instead, a technique utilizing temporal correlation may be used. This also falls within the scope of the present invention.

As described above, according to the present invention, by transmitting an image with information appended thereto concerning the size of the camera's imaging surface (CCD), the distance from the imaging surface to the lens center, and the focal length of the lens, when producing a display that matches the view angle at the time of shooting, the view angle at the time of shooting can be calculated with good accuracy at the display side even for an image photographed close to the subject, and a viewing distance that reproduces the view angle at the time of shooting can be determined with good accuracy.

Furthermore, when transmitting multi-viewpoint images, by appending information concerning the nearest point and farthest point within the image a display that alleviates eye strain (with parallax controlled) can be presented at the display side.

Moreover, by performing parallax control according to the fusing range of human eyes, the parallax can be brought within the fusing range in as many portions of the image as possible when displayed.

Further, by setting, at the transmitting side, the nearest point and farthest point to be appended to transmitted information at values different from the nearest point and farthest point in the actual image, and by performing parallax control at the display side so that the average value of the parallaxes corresponding to the nearest point and farthest point represented by the thus set values is brought to the center of the fusing range, an image at the depth intended by the image creator can be preferentially presented to the viewer.

Furthermore, according to the present invention, an object's contour line is detected in a region where the reliability of the parallax estimate by block matching is low, and in this way, parallax estimation can be performed so that the parallax changes discontinuously across the detected object's contour line.

Parallax estimation can also be performed so that the parallax changes discontinuously across an object's contour line of an arbitrary shape.

Further, by performing parallax padding at the transmitting side (the parallax estimation processing according to the present invention for causing the parallax to change discontinuously across an object's contour line and connect smoothly with surrounding parallax), the amount of computation at the receiving side can be reduced, permitting a reduction in the size of the receiving apparatus.

Moreover, by generating intermediate-viewpoint images at both the transmitting and receiving sides of the multi-viewpoint image transmission system, the amount of intermediate-viewpoint image transmission (the amount of residual transmission) can be reduced, as a result of which multi-viewpoint images can be compressed and transmitted efficiently while maintaining image quality.

What is claimed is:

1. An image transmission apparatus comprising:
   a transmitting section which computes from binocular images initial parallax relative to each of left and right images and a reliability evaluation value for said initial parallax and, for a region where initial parallax cannot be computed correctly, recomputes parallax at said region and which, from one of said binocular images and said parallax recomputed relative to said one image, predicts the other one of said binocular images and computes a prediction error, and from the parallax relative to said one image, predicts said parallax recomputed relative to said other image and computes a prediction error, and encodes and transmits said one image of said binocular images, said parallax recomputed relative to said one image, said prediction error of said other image of said binocular images, and said prediction error of said parallax recomputed relative to said other image; and
   a receiving section which receives said transmitted encoded signal, decodes said binocular images and said recomputed parallaxes from said received signal, generates an intermediate-viewpoint image by using said decoded binocular images and said decoded recomputed parallaxes, and displays said intermediate-viewpoint image and said binocular images together as multi-ocular images;
   wherein recomputing the parallax comprises the steps of
   (a) performing edge detection of an object in the images;
   (b) extracting a contour line of the object where parallax changes discontinuously by using the reliability evaluation value and results of the edge detection;
   (c) extracting the region where the reliability evaluation value for the initial parallax is low; and
   (d) recomputing the parallax at the extracted region, so that the parallax connects smoothly with surrounding parallax and changes across the contour line of the object.

2. An image transmission apparatus comprising:
   a transmitting section having image compression encoding means for selecting two images from among multi-ocular images, obtaining parallax relative to one of said two images, and obtaining a prediction error in the other image by using said parallax, and for encoding and outputting said obtained one image, said obtained parallax, and said obtained prediction error,
   intermediate-viewpoint image generating means for generating images at viewpoints corresponding to the remaining multi-ocular images other than said two images by using data decoded from said encoded one image, said encoded parallax, and said encoded prediction error, and
   residual compression encoding means for encoding and outputting residuals between said images generated by said intermediate-viewpoint image generating means and said remaining multi-ocular images; and
   a receiving section having
   decoding/image expanding means for receiving said encoded one image, said encoded parallax, and said encoded prediction error, and for decoding and outputting said two images, intermediate-viewpoint image generating means for generating images at viewpoints corresponding to the remaining multi-ocular images other than said two images by using said decoded two images,
   decoding/residual expanding means for receiving and decoding said encoded residuals, and
   means for reconstructing said remaining multi-ocular images by using said images generated by said intermediate-viewpoint image generating means and said decoded residuals.

3. An image transmission apparatus comprising:
   a transmitting section having image compression encoding means for selecting two images from among multi-ocular images, obtaining parallax relative to one of said two images, and obtaining a prediction error in the other image by using said parallax, and for encoding and outputting said obtained one image, said obtained parallax, and said obtained prediction error, intermediate-viewpoint image generating means for generating images at viewpoints corresponding to the remaining multi-ocular images other than said two images by using data decoded from said encoded one image, said encoded parallax, and said encoded prediction error, and residual compression encoding means for encoding and outputting residuals between said images generated by said intermediate-viewpoint image generating means and said remaining multi-ocular images; and a receiving section having decoding/image expanding means for receiving said encoded one image, said encoded parallax, and said encoded prediction error, and for decoding and outputting said two images, intermediate-viewpoint image generating means for generating images at viewpoints corresponding to the remaining multi-ocular images other than said two images by using said decoded two images, decoding/residual expanding means for receiving and decoding said encoded residuals, and means for reconstructing said remaining multi-ocular images by using said images generated by said intermediate-viewpoint image generating means and said decoded residuals, wherein when obtaining said parallax, a parallax estimation method is used comprising the steps of (a) computing an initial parallax between the two images and a reliability evaluation value for the initial parallax;

(b) performing edge detection of an object in the images;

(c) extracting a contour line of the object where parallax changes discontinuously by using the reliability evaluation value and results of the edge detection;

(d) extracting a region where the reliability evaluation value for the initial parallax is low; and (e) estimating a parallax at the extracted region, where the reliability evaluation value for the initial parallax is low, so that the parallax connects smoothly with surrounding parallax and changes across the contour line of the object.

4. A multi-viewpoint image transmission apparatus comprising a transmitting section wherein representative images are selected from among multi-ocular images, each unselected image is predicted by using two representative images nearest to said unselected image in terms of viewpoint direction and lying on both sides thereof and parallaxes relative to said two representative images are computed, a residual between said unselected image and its predicted image is computed, and said representative images and a prediction error of said unselected image are encoded and transmitted, and a receiving section wherein said transmitted encoded signal is received, said representative images are decoded, the image not selected as a representative image at the transmitting section is predicted by using the same method as used at the transmitting section, the prediction error of said unselected image is decoded, and said prediction error is superimposed on said predicted image to reconstruct a multi-viewpoint image, wherein said parallaxes relative to said two representative images are computed using a method comprising the steps of:

(a) computing an initial parallax between the two images and a reliability evaluation value for the initial parallax;

(b) performing edge detection of an object in the images;

(c) extracting a contour line of the object where parallax changes discontinuously by using the reliability evaluation value and results of the edge detection;

(d) extracting a region where the reliability evaluation value for the initial parallax is low; and (e) estimating a parallax at the extracted region, where the reliability evaluation value for the initial parallax is low, so that the parallax connects smoothly with surrounding parallax and changes across the contour line of the object.

5. A multi-viewpoint image transmission apparatus according to claim 4, wherein one representative image is selected and the other representative images are predicted from said one representative image and parallaxes are computed on said other representative images relative to said one representative image.

6. A method for transmitting multi-ocular images, comprising the steps of:

(a) selecting two images from among the multi-ocular images;

(b) obtaining parallax relative to one of the selected two images;

(c) obtaining a prediction error in another image of the selected two images using the obtained parallax;

(d) encoding the one of the selected two images, the parallax relative to the one of the selected two images, and the obtained prediction error in the other image of the selected two images;

(e) generating images at viewpoints corresponding to the remaining multi-ocular images other than the two images using data decoded from the data encoded in step (d);

(f) enclosing residuals between the images generated in step (e) and the remaining multi-ocular images; and (g) transmitting a message including the image, the parallax and the prediction error encoded in step (d), and the residuals encoded in step (f).

7. The method of claim 6 including receiving the multi-ocular images, comprising the steps of:

(h) receiving the transmitted message;

(i) decoding the transmitted message to obtain a reconstructed set of the two selected images;

(j) generating images at viewpoints corresponding to the remaining multi-ocular images using the reconstructed set obtained in step (i); and (k) reconstructing the remaining multi-ocular images using the images generated in step (j) and decoded residuals obtained by decoding the transmitted message.

8. The image transmission apparatus of claim 6 wherein parallax limits in the images are appended for transmission so that the images can be brought within a fusing range, and the images are displayed by considering the parallax limits and the fusing range.

9. The image transmission apparatus of claim 6 wherein information concerning a camera's imaging size and a distance between a lens center and an imaging surface is appended for transmission so that information concerning a view angle at the time of image capturing is obtained at a display-producing side.

10. The image transmission apparatus of claim 9, wherein a nearest point and a farthest point within the images are set at the transmitting side, and the images with two or more viewpoints are displayed by performing parallax control at the display-producing side so that the average of parallax corresponding to the nearest point and parallax corresponding to the farthest point coincides with the center of a fusing range.

11. A method for transmitting and displaying multi-viewpoint images comprising the steps of:
   (a) forming images with at least two viewpoints for transmission;
   (b) appending at least one of distance limit and parallax limit to said images for transmission;
   (c) transmitting the images and the appended limit so that when displayed the images are brought within a fusing range;
   (d) receiving the images and appended limit;
   (e) estimating parallax between the images within the appended limit; and
   (f) displaying the images.

12. A multi-viewpoint image transmission and display method according to claim 11, wherein a frequency is obtained for each parallax between said images, and said images with two or more viewpoints are displayed by performing parallax control so that said frequency of each parallax becomes maximum within said fusing range.

13. A multi-viewpoint image transmission and display method according to claim 11, wherein an average of parallaxes between said images is obtained, and said images with two or more viewpoints are displayed by performing parallax control so that said average parallax coincides with a center of said fusing range.

14. A method for transmitting and displaying multi-viewpoint images having a fusing range comprising the steps of:
   (a) forming images with at least two viewpoints for transmission;
   (b) setting a nearest point and a farthest point within the images;
   (c) transmitting the images and nearest and farthest points;
   (d) receiving the images and the nearest and farthest points;
   (e) estimating parallax by (1) computing parallax to the nearest point, (2) computing parallax to the farthest point and (3) obtaining an averaged parallax by adding both computed parallaxes and dividing the result by two;
   (f) fusing the images by performing parallax control so that the averaged parallax coincides with a center of the fusing range.

15. A method for parallax estimation comprising the steps of:
   (a) computing an initial parallax between two images and a reliability evaluation value for the initial parallax;
   (b) performing edge detection of an object in the images;
   (c) extracting a contour line of the object where parallax changes discontinuously by using the reliability evaluation value and results of the edge detection;
   (d) extracting a region where the reliability evaluation value for the initial parallax is low; and
   (e) estimating a parallax at the extracted region, where the reliability evaluation value for the initial parallax is low, so that the parallax connects smoothly with surrounding parallax and changes across the contour line of the object.

16. A parallax estimation method according to claim 15, wherein the parallax at said region where the reliability of said initial parallax is low is determined as to minimize parallax distribution energy by using said parallax and said object's contour line.

17. A parallax estimation method according to claim 15, wherein said edge detection is performed by combining outputs of direction-selective filters having different frequency characteristics.

18. A parallax estimation method according to claim 17, wherein said edge detection includes edge line extraction based on the result of combining the outputs of said direction-selective filters having different frequency characteristics.

19. A parallax estimation method according to claim 15, wherein said reliability evaluation value for said initial parallax is computed by using the sum of squares of differences used for the computation of said initial parallax.

20. A parallax estimation method according to claim 15, wherein said reliability evaluation value for said initial parallax is computed by using the sum of squares of differences per pixel used for the computation of said initial parallax.

21. A parallax estimation method according to claim 15, wherein said reliability evaluation value for said initial parallax is computed by using image noise level and luminance gradient as well as the sum of squares of differences used for the computation of said initial parallax.

22. A parallax estimation method according to claim 15, wherein said reliability evaluation value for said initial parallax is computed by using a difference between initial parallaxes computed relative to left and right images.

23. A parallax estimation method wherein said reliability evaluation value of said initial parallax is computed by combining two or more of the parallax estimation methods described in claim 19.

24. A parallax estimation method wherein said reliability evaluation value for said initial parallax is computed by combining two or more of the parallax estimation methods described in claim 20.

25. A parallax estimation method wherein said reliability evaluation value for said initial parallax is computed by combining two or more of the parallax estimation methods described in claim 21.

26. A parallax estimation method wherein said reliability evaluation value for said initial parallax is computed by combining two or more of the parallax estimation methods described in claim 22.

* * * * *